(12) United States Patent
Kudo

(10) Patent No.: US 12,474,563 B2
(45) Date of Patent: Nov. 18, 2025

(54) GUIDANCE METHOD, NON-TRANSITORY STORAGE MEDIUM, IMAGING DEVICE, INFORMATION PROCESSING DEVICE, AND MICROSCOPE DEVICE

(71) Applicant: ARKRAY, Inc., Kyoto (JP)

(72) Inventor: Akitsugu Kudo, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 280 days.

(21) Appl. No.: 18/462,249

(22) Filed: Sep. 6, 2023

(65) Prior Publication Data

US 2024/0085687 A1    Mar. 14, 2024

(30) Foreign Application Priority Data

Sep. 9, 2022  (JP) .................................. 2022-144171

(51) Int. Cl.
   *G02B 21/36*   (2006.01)
   *G06V 10/25*   (2022.01)
   *G06V 10/74*   (2022.01)

(52) U.S. Cl.
   CPC .......... *G02B 21/365* (2013.01); *G06V 10/25* (2022.01); *G06V 10/761* (2022.01)

(58) Field of Classification Search
   CPC .... G02B 21/26; G02B 21/361; G02B 21/362; G02B 21/365; G06V 10/25; G06V 10/761
   See application file for complete search history.

(56) References Cited

U.S. PATENT DOCUMENTS

| | | | |
|---|---|---|---|
| 11,543,638 B2 * | 1/2023 | Hu | ......................... G02B 21/34 |
| 2013/0100271 A1 * | 4/2013 | Howes | ................... A61B 3/135 |
| | | | 348/E5.025 |

(Continued)

FOREIGN PATENT DOCUMENTS

| | | |
|---|---|---|
| JP | 2018-031890 A | 3/2018 |
| JP | 2020-071037 A | 5/2020 |

OTHER PUBLICATIONS

The extended European search report issued by the European Patent Office on Jan. 30, 2024, which corresponds to European Patent Application No. 23194954.6-1020 and is related to U.S. Appl. No. 18/462,249.

(Continued)

*Primary Examiner* — Zhiyu Lu
(74) *Attorney, Agent, or Firm* — Studebaker Brackett PLLC

(57) ABSTRACT

A guidance method guides a camera held by a holder holding the camera that captures a field of view of a microscope through an eyepiece lens of the microscope to an appropriate holding position with respect to an optical axis of the eyepiece lens. The guidance method comprises a computer executes: acquiring, from the camera, an image of the field of view captured by the camera held by the holder; specifying a visual field area in the image corresponding to the field of view; obtaining a center of gravity coordinate of the visual field area; and creating guidance information to the holding position based on a comparison between the center of gravity coordinate and a reference coordinate corresponding to a center of gravity of the visual field area obtained from an image captured by the camera held at the holding position.

14 Claims, 20 Drawing Sheets

(56) References Cited

U.S. PATENT DOCUMENTS

| | | | | |
|---|---|---|---|---|
| 2015/0054935 A1* | 2/2015 | Muramatsu | ............ | G02B 21/24 |
| | | | | 359/392 |
| 2018/0049840 A1* | 2/2018 | Awdeh | ................... | A61B 90/20 |
| 2019/0313902 A1 | 10/2019 | Charles | | |
| 2020/0026055 A1* | 1/2020 | Li | ......................... | A61B 3/135 |
| 2020/0134287 A1 | 4/2020 | Fujimoto et al. | | |

OTHER PUBLICATIONS

Skandarajah Arunan et al., "Quantitative Imaging with a Mobile Phone Microscope", PLOS ONE, vol. 9, No. 5, May 13, 2014, p. e96906.

R. Dendere et al., "A review of cellphone microscopy for disease detection", Journal of Microscopy, vol. 260, No. 3, Dec. 1, 2015, pp. 248-259.

\* cited by examiner

FIG.11
RIGHTWARD SHIFT POSITION
FIRST VALUE: LARGE
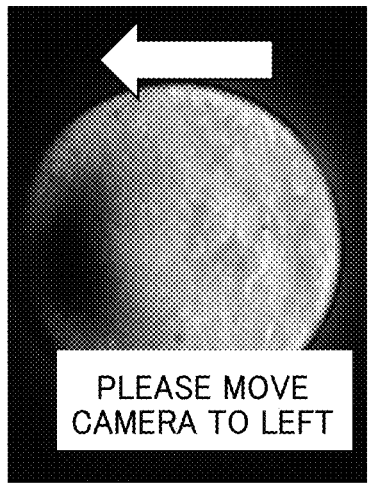
FIRST VALUE: SMALL
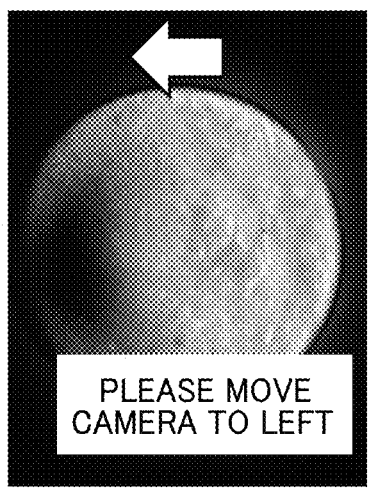

US 12,474,563 B2

GUIDANCE METHOD, NON-TRANSITORY STORAGE MEDIUM, IMAGING DEVICE, INFORMATION PROCESSING DEVICE, AND MICROSCOPE DEVICE

CROSS-REFERENCE TO RELATED APPLICATION

This application is based on and claims priority under 35 USC 119 from Japanese Patent Application No. 2022-144171 filed on Sep. 9, 2022, the disclosure of which is incorporated by reference herein.

BACKGROUND

Technical Field

The present disclosure relates to a guidance method, a non-transitory storage medium, an imaging device, an information processing device, and a microscope device.

Japanese Patent Application Laid-Open (JP-A) No. 2018-31890, for example, describes a microscope that captures an image of a sample to be observed by a camera function of a portable information terminal and displays the image on a display. The microscope includes a microscope body and a placing table that is detachably connectable to the microscope body at plural connection positions and on which a portable information terminal is placed in a state of being connected to the microscope body. The microscope body includes a sample placement section for placing a sample, a light source for irradiating the sample placed on the sample placement section with light, and an optical system disposed inside the microscope body. The optical system includes an objective lens on which light from the sample placed on the sample placement section is incident, and an eye lens on which light from the objective lens is incident and that emits the incident light to the outside of the microscope body. The placing table includes plural see-through windows formed at positions coinciding with the camera lens of any one of the various mobile information terminals when any one of the plural types of mobile information terminal is placed thereon, and the placing table and the microscope body are configured to be connectable such that the see-through window coincides with a position of the eye lens in a state where the camera lens of the mobile information terminal and the see-through window are coincident.

In order to observe the sample well, it is necessary to adjust an optical axis of an eyepiece lens of the microscope and an optical axis of the camera to match them as accurately as possible. However, fine operation is required for position adjustment with respect to the optical axis of the eyepiece lens provided in a high-magnification microscope.

SUMMARY

An object of the present disclosure is to provide a guidance method, a non-transitory storage medium, an imaging device, an information processing device, and a microscope device that can easily adjust a position of a camera with respect to an eyepiece lens of a microscope.

A guidance method according to one aspect of the present disclosure is a guidance method for guiding a camera, which is held by a holder and which captures a field of view of a microscope through an eyepiece lens of the microscope, to an appropriate holding position with respect to an optical axis of the eyepiece lens, the method including, by a computer: acquiring, from the camera, an image of the field of view captured by the camera held by the holder; specifying a visual field area in the image, the visual field area corresponding to the field of view; obtaining a center of gravity coordinate of the visual field area; creating guidance information to guide the camera to the holding position based on a comparison between the center of gravity coordinate and a reference coordinate corresponding to a center of gravity of the visual field area obtained from an image captured by the camera held at the holding position; and outputting the guidance information.

According to the present disclosure, it is possible to easily adjust the position of the camera with respect to the eyepiece lens of the microscope.

BRIEF DESCRIPTION OF THE DRAWINGS

FIG. 11 is a diagram illustrating another example of the guidance information displayed together with the captured image according to the embodiment.

DETAILED DESCRIPTION

Hereinafter, an example of a mode for carrying out the technology of the present disclosure will be described in detail with reference to the drawings. Note that components and processes having the same operation, action, and function are denoted by the same reference signs throughout the drawings, and redundant description may be omitted as appropriate. Each drawing is only schematically illustrated to the extent that the technology of the disclosure can be sufficiently understood. Therefore, the technology of the disclosure is not limited only to the illustrated example. Furthermore, in the present embodiment, description of configurations that are not directly related to the disclosure or well-known configurations may be omitted.

First Embodiment

Figure 1:
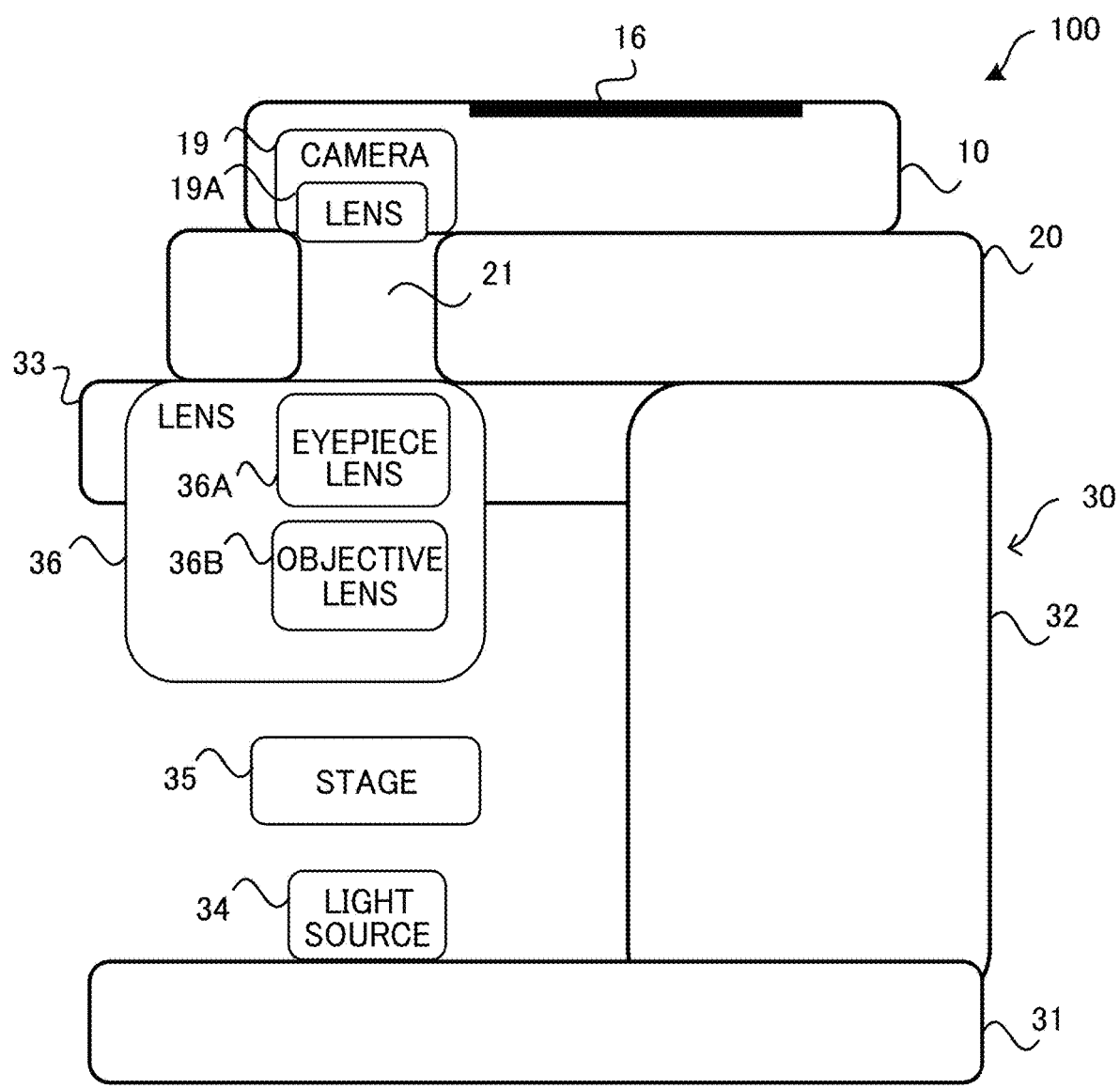
FIG. 1 is a side view schematically illustrating an example of a microscope device according to a first embodiment.

FIG. 1 is a side view schematically illustrating an example of a microscope device 100 according to a first embodiment.

As illustrated in FIG. 1, the microscope device 100 according to the present embodiment includes an imaging device 10, a holder 20, and a microscope 30. The imaging device 10 includes a display unit 16 and a camera 19. The camera 19 is, for example, a camera using a charge coupled device (CCD), and the camera 19 is provided with a lens (hereinafter, referred to as a "camera lens") 19A. As the imaging device 10, for example, a portable device such as a smartphone, a tablet terminal, or a digital still camera is applied. The display unit 16 is a display integrally provided with a touch panel, and displays a captured image obtained by capturing by the camera 19.

Note that a portable microscope (for example, Handy Microscope DX (Distributor: Raymay Fujii Corporation, model number: RXT300N), Reference HP: https://www.raymay.co.jp/nature/contents/micro/item/RXT300/) can be cited as a reference example of a microscope device capable of capturing a field of view of a microscope with a smartphone camera.

The microscope 30 includes a housing lower portion 31, a housing support portion 32, a housing upper portion 33, a light source 34, a stage 35, and a lens 36. The housing lower portion 31 is connected to a lower end of the housing support portion 32, and the housing upper portion 33 is connected to an upper end thereof. The light source 34 is disposed in the housing lower portion 31, and the lens 36 is disposed in the housing upper portion 33. The stage 35 on which a sample is placed is disposed between the light source 34 and the lens 36. The lens 36 includes an eyepiece lens 36A and an objective lens 36B. The eyepiece lens 36A is disposed in the housing upper portion 33 such that an optical axis of the eyepiece lens 36A faces upward. Light from the light source 34 is applied to the stage 35, the transmitted light transmitted through the stage 35 is incident on the eyepiece lens 36A through the objective lens 36B, and the light incident on the eyepiece lens 36A is emitted toward the imaging device 10.

The holder 20 includes a through hole 21 penetrating an upper surface and a lower surface of the holder 20 in a vertical direction, and is disposed on the housing upper portion 33 of the microscope 30 so that the optical axis of the eyepiece lens 36A is exposed to an upper surface side of the holder 20 through the through hole 21. The holder 20 detachably holds the imaging device 10 such that an optical axis of the camera lens 19A of the imaging device 10 faces downward. Specifically, the imaging device 10 is placed on the upper surface of the holder 20. The camera lens 19A of the imaging device 10 and the eyepiece lens 36A of the microscope 30 are provided to face each other via the through hole 21 of the holder 20. As a result, the imaging device 10 can capture a field of view of the microscope 30. The holder 20 holds the camera 19, that is, the imaging device 10 such that the optical axis of the camera lens 19A and the optical axis of the eyepiece lens 36A are parallel to each other. The term "parallel" as used herein is not limited to perfect parallel, and is allowed to include a predetermined error. The holder 20 has a structure capable of moving the held imaging device 10 in a horizontal direction (that is, a direction parallel to a display surface of the display unit 16), and can adjust a two-dimensional position of the camera 19.

Figure 2:
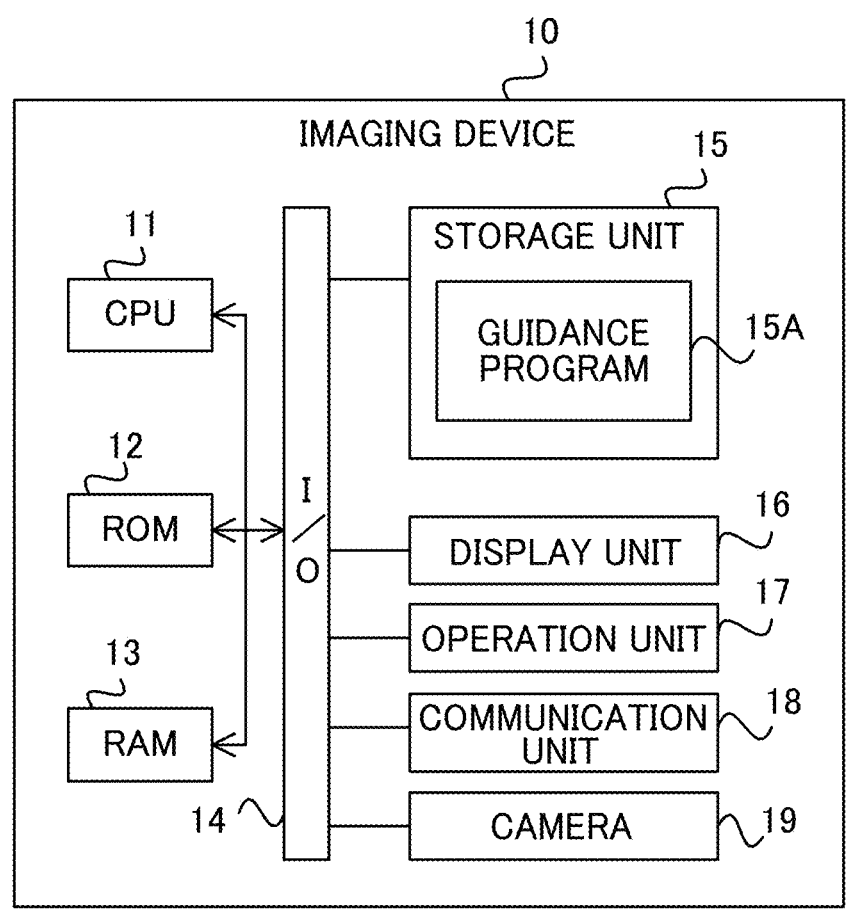
FIG. 2 is a block diagram illustrating an example of an electrical configuration of an imaging device according to the first embodiment.

FIG. 2 is a block diagram illustrating an example of an electrical configuration of the imaging device 10 according to the first embodiment.

As illustrated in FIG. 2, the imaging device 10 according to the present embodiment includes a central processing unit (CPU) 11, a read only memory (ROM) 12, a random access memory (RAM) 13, an input/output interface (I/O) 14, a storage unit 15, the display unit 16, an operation unit 17, a communication unit 18, and the camera 19.

The CPU 11, the ROM 12, the RAM 13, and the I/O 14 constitute a control unit. Each unit of the CPU 11, the ROM 12, the RAM 13, and the I/O 14 is connected via a bus.

Each functional unit including the storage unit 15, the display unit 16, the operation unit 17, the communication unit 18, and the camera 19 is connected to the I/O 14. These functional units can communicate with the CPU 11 via the I/O 14.

The control unit may be configured as a sub-control unit that controls a part of the operation of the imaging device 10, or may be configured as a part of a main control unit that controls the entire operation of the imaging device 10. For some or all of the blocks of the control unit, for example, an integrated circuit such as a large scale integration (LSI) or an integrated circuit (IC) chip set is used. An individual circuit may be used for each of the blocks, or a circuit in which some or all of the blocks are integrated may be used. The blocks may be provided integrally with each other, or some of the blocks may be provided separately. Furthermore, a part of each of the blocks may be provided separately. The integration of the control unit is not limited to LSI, and a dedicated circuit or a general-purpose processor may be used.

As the storage unit 15, for example, a hard disk drive (HDD), a solid state drive (SSD), a flash memory, or the like is used. The storage unit 15 stores a guidance program 15A according to the present embodiment. Note that the guidance program 15A may be stored in the ROM 12.

The guidance program 15A is a program for guiding the camera 19 held by the holder 20 to an appropriate holding position with respect to the optical axis of the eyepiece lens

36A, for example, a holding position (Hereinafter, the position is referred to as an "appropriate position".) where the optical axis of the eyepiece lens 36A and the optical axis of the camera 19 (camera lens 19A) are matched. The guidance program 15A may be installed in advance in the imaging device 10, for example. The guidance program 15A may be realized by being stored in a non-volatile non-transitory storage medium or distributed via a network line and installed or upgraded, as appropriate, in the imaging device 10. Note that, as an example of the non-volatile non-transitory storage medium, a compact disc read only memory (CD-ROM), a magneto-optical disk, an HDD, a digital versatile disc read only memory (DVD-ROM), a flash memory, a memory card, and the like are assumed. Note that "the optical axis of the eyepiece lens 36A and the optical axis of the camera 19 are matched" includes not only that the optical axis of the eyepiece lens 36A and the optical axis of the camera 19 are perfectly matched, but also that the optical axis of the eyepiece lens 36A and the optical axis of the camera 19 are substantially matched so that the camera 19 can satisfactorily capture the field of view of the microscope 30.

As the display unit 16, for example, a liquid crystal display (LCD), an organic electro luminescence (EL) display, or the like is used. The display unit 16 integrally includes a touch panel. The operation unit 17 is provided with, for example, a power button, a volume button, and the like. The display unit 16 displays a captured image obtained by capturing by the camera 19.

The communication unit 18 is connected to a network line such as the Internet, a local area network (LAN), or a wide area network (WAN), and can communicate with an external device via the network line.

As described above, the camera 19 is, for example, a camera using a CCD, and captures a field of view of the microscope 30 through the eyepiece lens 36A and the objective lens 36B of the microscope 30.

By the way, as described above, in order to observe the sample well, it is necessary to adjust the optical axis of the eyepiece lens of the microscope and the optical axis of the camera and to match them as accurately as possible. However, fine operation is required for position adjustment with respect to the optical axis of the eyepiece lens provided in the high-magnification microscope. Furthermore, since an image seen from the eyepiece lens is often seen to be reversed vertically and horizontally, the position adjustment becomes more difficult.

On the other hand, in the case of guiding the camera 19 held by the holder 20 to the appropriate position, the imaging device 10 according to the present embodiment acquires the captured image captured by the camera 19 held by the holder 20, specifies a visual field area corresponding to the field of view of the microscope 30 from the acquired captured image, obtains a center of gravity coordinate of the visual field area, and creates and outputs guidance information to the appropriate position on the basis of a comparison between the center of gravity coordinate and a reference coordinate corresponding to a center of gravity of the visual field area obtained from the captured image captured by the camera 19 held at the appropriate position. Note that, as described above, the appropriate position is a holding position when the optical axis of the eyepiece lens 36A and the optical axis of the camera 19, that is, the camera lens 19A are matched.

Figure 3:
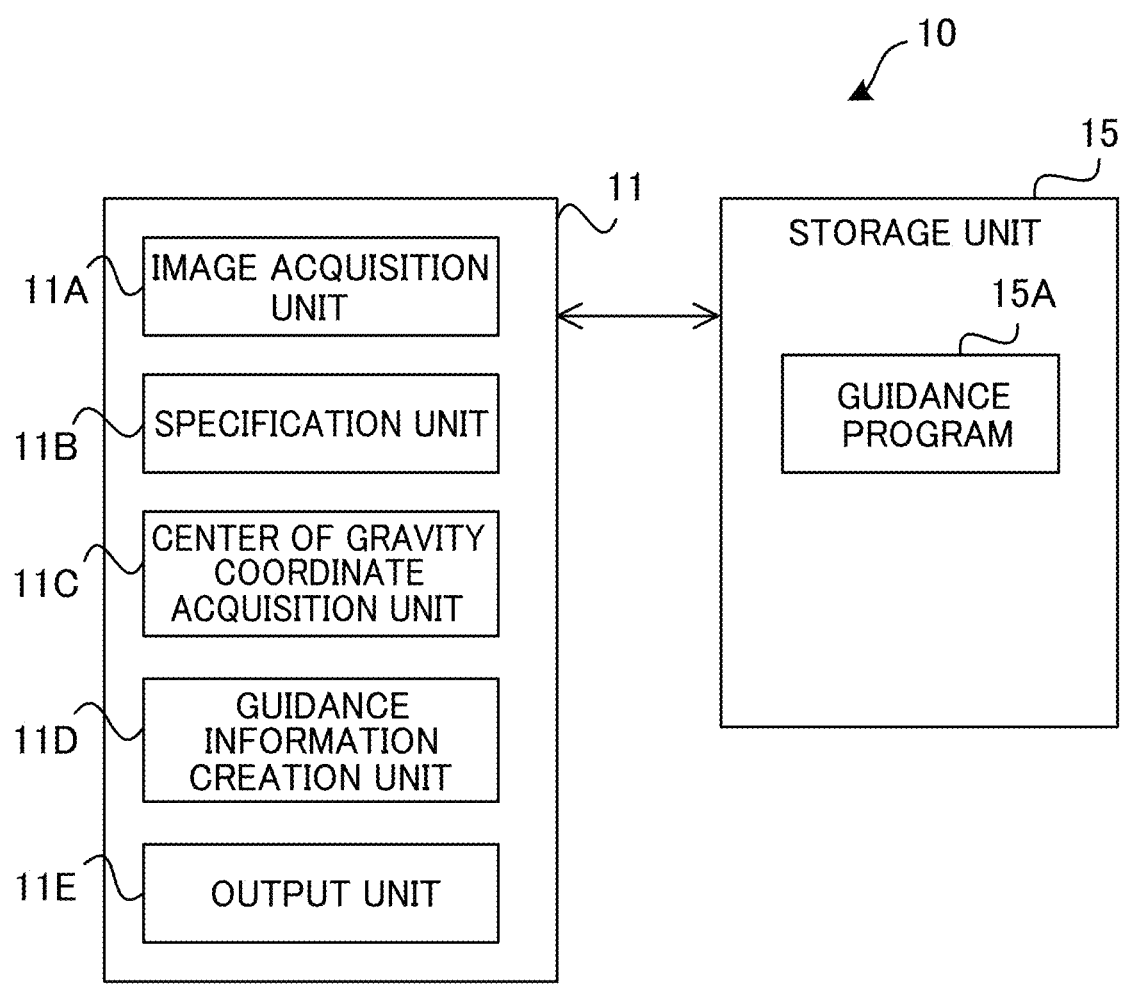
FIG. 3 is a block diagram illustrating an example of a functional configuration of the imaging device according to the first embodiment.

Specifically, the CPU 11 of the imaging device 10 according to the present embodiment functions as each unit illustrated in FIG. 3 by writing and executing the guidance program 15A stored in the storage unit 15 or the ROM 12 in the RAM 13.

FIG. 3 is a block diagram illustrating an example of a functional configuration of the imaging device 10 according to the first embodiment.

As illustrated in FIG. 3, the CPU 11 of the imaging device 10 according to the present embodiment functions as an image acquisition unit 11A, a specification unit 11B, a center of gravity coordinate acquisition unit 11C, a guidance information creation unit 11D, and an output unit 11E.

The image acquisition unit 11A acquires, from the camera 19, a captured image obtained by capturing a field of view of the microscope 30 by the camera 19 held by the holder 20. The captured image includes an area (visual field area) in which the field of view of the microscope 30 is captured in the captured image. In other words, there is a visual field area corresponding to the field of view of the microscope 30 in the captured image.

The specification unit 11B specifies a visual field area corresponding to the field of view from the captured image acquired by the image acquisition unit 11A. That is, an area (visual field area) corresponding to the field of view included in the captured image is extracted. Since the field of view of the microscope 30 appears brighter in the captured image than a portion other than the field of view, for example, the captured image is binarized by binarization processing, and a high luminance region of the binarized image is specified as a visual field area. In addition to the binarization processing, a known method such as Snake/Active Contour method, Mean Shift method, Graph Cuts method, Region Growing method, or Otsu's binarization method is used for the area extraction.

The center of gravity coordinate acquisition unit 11C obtains a center of gravity coordinate of the visual field area specified by the specification unit 11B. Specifically, for example, a center of gravity coordinate of the high luminance region specified by the specification unit 11B is calculated as the center of gravity coordinate of the visual field area. For example, it is assumed that a weight of each coordinate (each pixel) of the visual field area is the same, and a simple average of the visual field area is obtained as the center of gravity coordinate. Specifically, X coordinate values of all the coordinates (respective pixels) included in the visual field area are summed, and a value obtained by dividing the obtained total value by the number of coordinates included in the visual field area is set as an X coordinate of the center of gravity coordinate. Similarly, Y-coordinate values of all the coordinates (respective pixels) included in the visual field area are summed, and a value obtained by dividing the obtained total value by the number of coordinates included in the visual field area is set as a Y-coordinate of the center of gravity coordinate. A known method (See, e.g., 1. https://www.higashisalary.com/entry/cv2-calc-moment, 2. https://plant-raspberrypi3.hatenablog.com/entry/2018/11/13/185057) is used for the center of gravity coordinate calculation processing. Note that the center of gravity coordinate is a coordinate in the coordinate system of the captured image.

The guidance information creation unit 11D creates guidance information to the appropriate position on the basis of a comparison between the center of gravity coordinate obtained by the center of gravity coordinate acquisition unit 11C and a reference coordinate corresponding to a center of gravity of the visual field area obtained from the captured image captured by the camera 19 held at the appropriate position.

Here, each of the center of gravity coordinate and the reference coordinate is represented by a first coordinate and a second coordinate representing a two-dimensional position on the captured image. The first coordinate is, for example, an X coordinate, and the second coordinate is, for example, a Y coordinate. The X coordinate in the captured image corresponds to a coordinate in the right-left direction with the current position of the camera 19 as an origin, and the Y coordinate in the captured image corresponds to a coordinate in the back-front direction with the current position of the camera 19 as an origin. That is, the X and Y coordinates in the captured image correspond to a position of the camera 19. Therefore, the position in the vertical direction and the position in the horizontal direction of the camera 19 can be adjusted based on a comparison between the X coordinate and the Y coordinate of the center of gravity coordinate and the X coordinate and the Y coordinate of the reference coordinate.

The output unit 11E outputs the guidance information created by the guidance information creation unit 11D. An output destination of the guidance information is, for example, the display unit 16.

Next, a method of obtaining the reference coordinate corresponding to the center of gravity of the visual field area obtained from the image captured by the camera 19 held at the appropriate position will be specifically described with reference to FIGS. 4 and 5.

Figure 4:
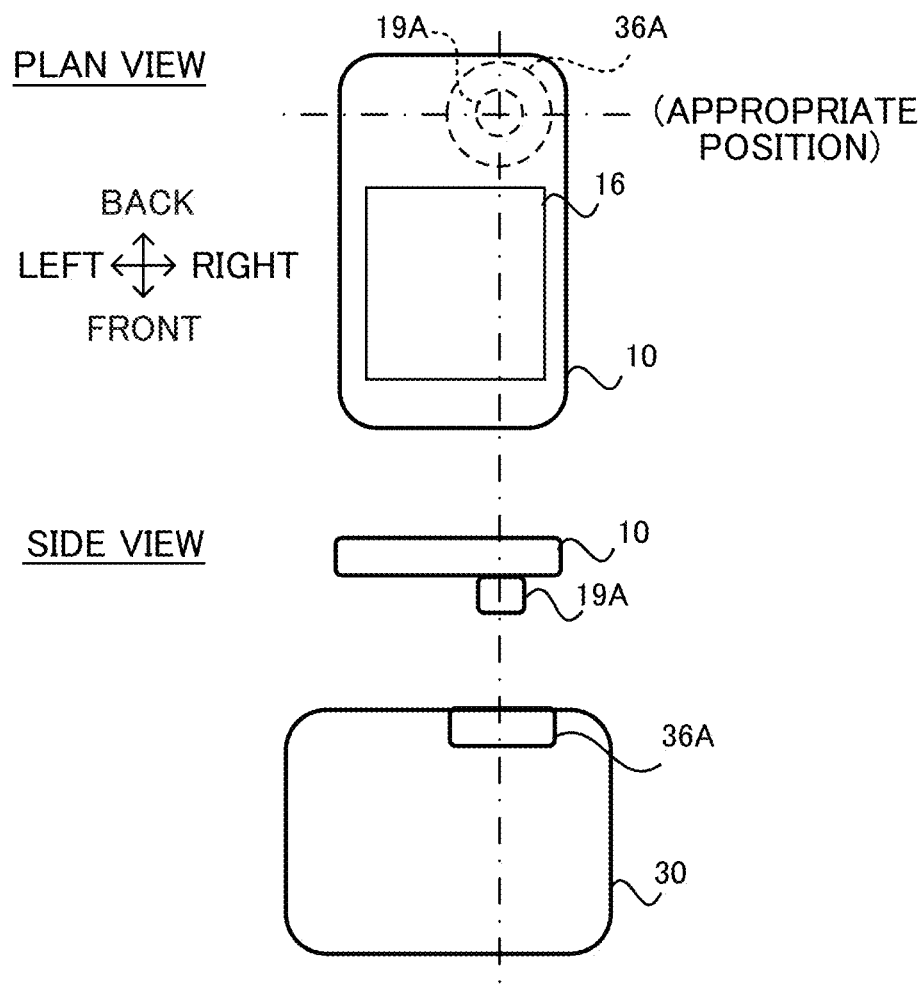
FIG. 4 is a plan view and a side view schematically illustrating an example of a positional relationship between an imaging device held at an appropriate position and a microscope according to an embodiment.

FIG. 4 is a plan view and a side view schematically illustrating an example of a positional relationship between the imaging device 10 held at the appropriate position and the microscope 30 according to the present embodiment. Note that, in order to simplify the description, the holder 20 is not illustrated, and also, the microscope 30 is not illustrated in the plan view. Furthermore, FIG. 5 is a diagram illustrating an example of a captured image captured at the appropriate position, a binarized image, and a reference coordinate.

As illustrated in FIG. 4, a display surface of the display unit 16 of the imaging device 10 is disposed at the appropriate position on the holder 20 along the horizontal direction. The holding position of the imaging device 10 in the horizontal direction when the optical axis of the eyepiece lens 36A and the optical axis of the camera lens 19A are matched is the appropriate position of the imaging device 10. The captured image obtained by capturing the field of view of the microscope with the imaging device 10 at the appropriate position includes a circular visual field area. Therefore, a position of the imaging device 10 is adjusted while viewing the captured image displayed on the display unit 16, and the position of the imaging device 10 at which the captured image including the circular visual field area is obtained is set as the appropriate position. In the present embodiment, when a user views the display unit 16 from above, a longitudinal direction of the imaging device 10 is defined as the back-front direction as viewed from the user, and a lateral direction is defined as the right-left direction as viewed from the user. Here, a direction from the display unit 16 toward the camera lens 19A is defined as a backward direction. Note that the method of disposing the imaging device 10 at the appropriate position is not limited thereto, and for example, a position of the eyepiece lens 36A in the microscope 30 can be measured, and the appropriate position can be determined on the basis of the measurement result.

Figure 5:
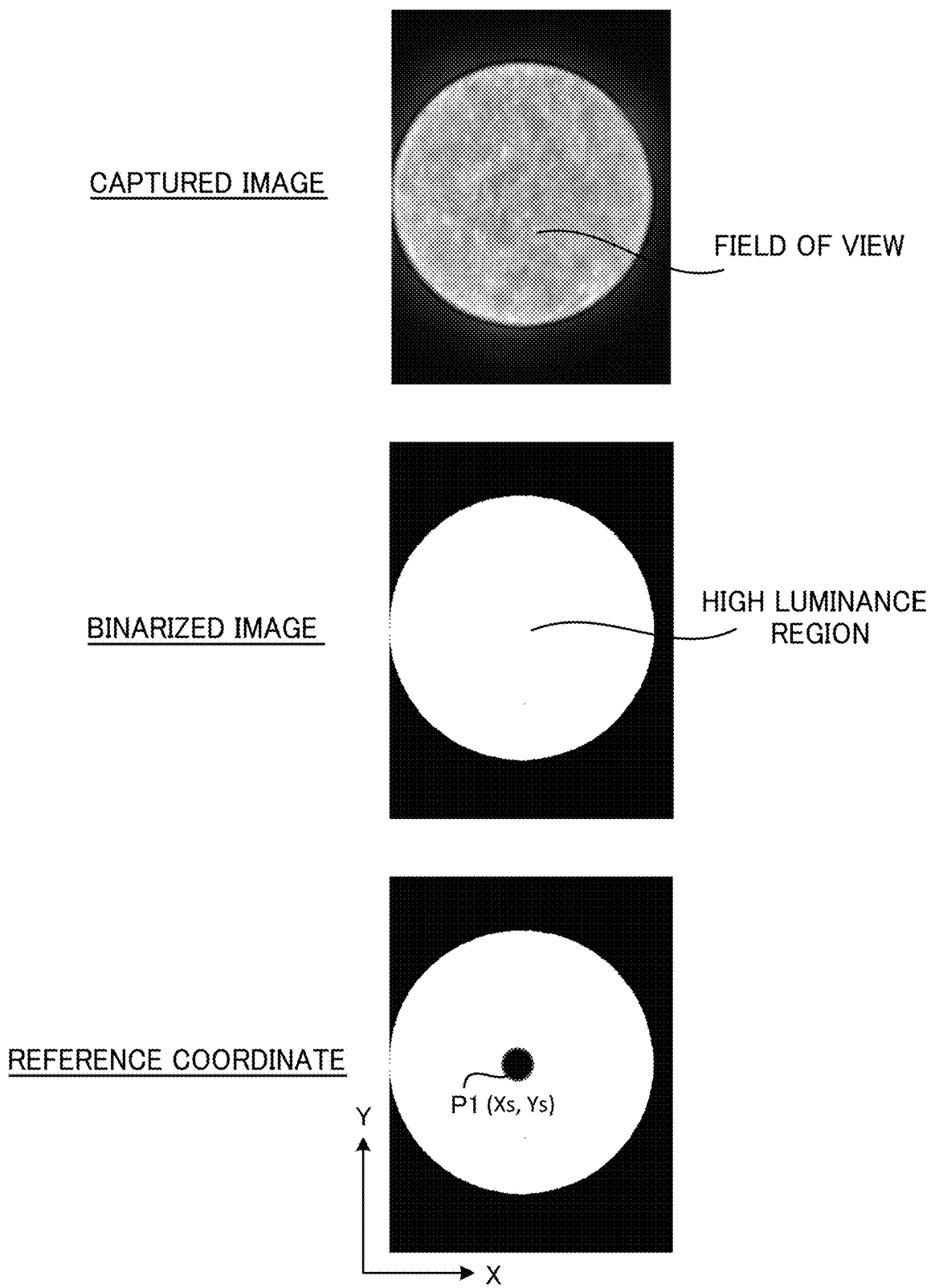
FIG. 5 is a diagram illustrating an example of a captured image captured at an appropriate position, a binarized image, and a reference coordinate.

A captured image illustrated in FIG. 5 is the captured image captured at the appropriate position illustrated in FIG. 4. The visual field area is an area corresponding to the field of view of the microscope 30, and is specified from the captured image captured by the camera 19 and displayed on the display unit 16. In the example of FIG. 5, a circular portion at a center of the image represents the field of view (visual field area). A binarized image is an image obtained by binarizing the captured image, and a high luminance region that is a circular white portion at the center of the image is specified as the visual field area. A reference coordinate P1(Xs, Ys) can be obtained by calculating a center of gravity coordinate of the high luminance region specified from the binarized image and using the obtained center of gravity coordinate as a center of gravity coordinate of the visual field area.

Next, a method of obtaining a direction in which the camera 19 is moved on the basis of the center of gravity coordinate corresponding to the center of gravity of the visual field area included in the captured image captured by the camera 19 held at a position shifted from the appropriate position and the reference coordinate will be specifically described with reference to FIGS. 6 to 8.

Figure 6:
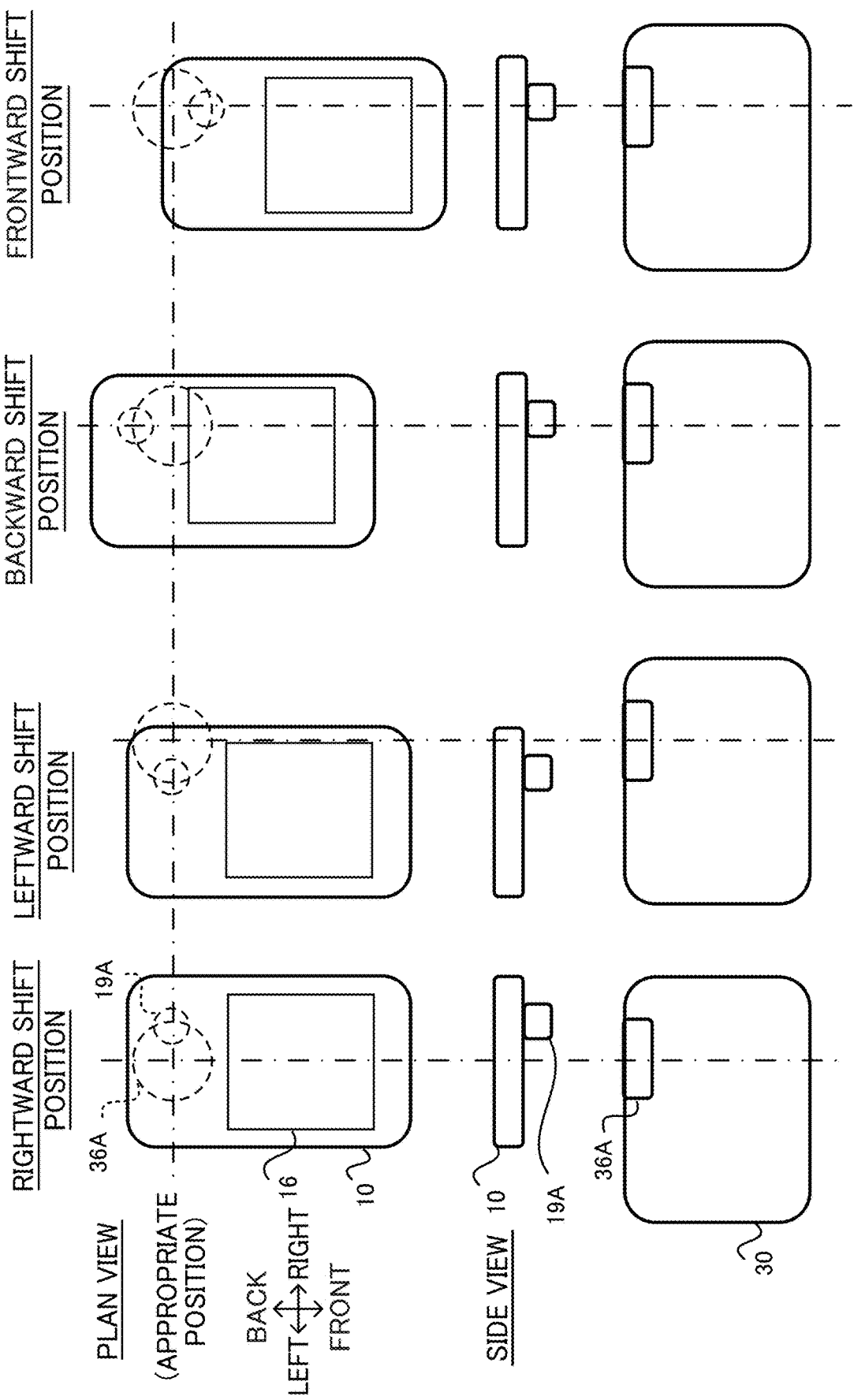
FIG. 6 is a plan view and a side view schematically illustrating an example of a positional relationship between an imaging device held at a position shifted from an appropriate position and a microscope according to an embodiment.

FIG. 6 is a plan view and a side view schematically illustrating an example of a positional relationship between the imaging device 10 held at a position shifted from the appropriate position and the microscope 30 according to the present embodiment. Note that, in order to simplify the description, the holder 20 is not illustrated, and also, the microscope 30 is not illustrated in the plan view. Furthermore, FIGS. 7 and 8 are diagrams illustrating examples of a captured image captured at a position shifted from the appropriate position, a binarized image, and a center of gravity coordinate.

As illustrated in FIG. 6, the display surface of the display unit 16 of the imaging device 10 is disposed along the horizontal direction. When the user looks at the display unit 16, the longitudinal direction of the imaging device 10 is defined as the back-front direction as viewed from the user, and the lateral direction is defined as the right-left direction as viewed from the user. Here, a direction from the display unit 16 toward the camera lens 19A is defined as a backward direction. A "rightward shift position" is a position where the holding position of the imaging device 10 in the horizontal direction is shifted rightward from the appropriate position. A "leftward shift position" is a position where the holding position of the imaging device 10 in the horizontal direction is shifted leftward from the appropriate position. A "backward shift position" is a position where the holding position of the imaging device 10 in the horizontal direction is shifted backward from the appropriate position. A "frontward shift position" is a position where the holding position of the imaging device 10 in the horizontal direction is shifted frontward from the appropriate position. The imaging device 10 is disposed at the "rightward shift position", the "leftward shift position", the "backward shift position", and the "frontward shift position".

Figure 7:
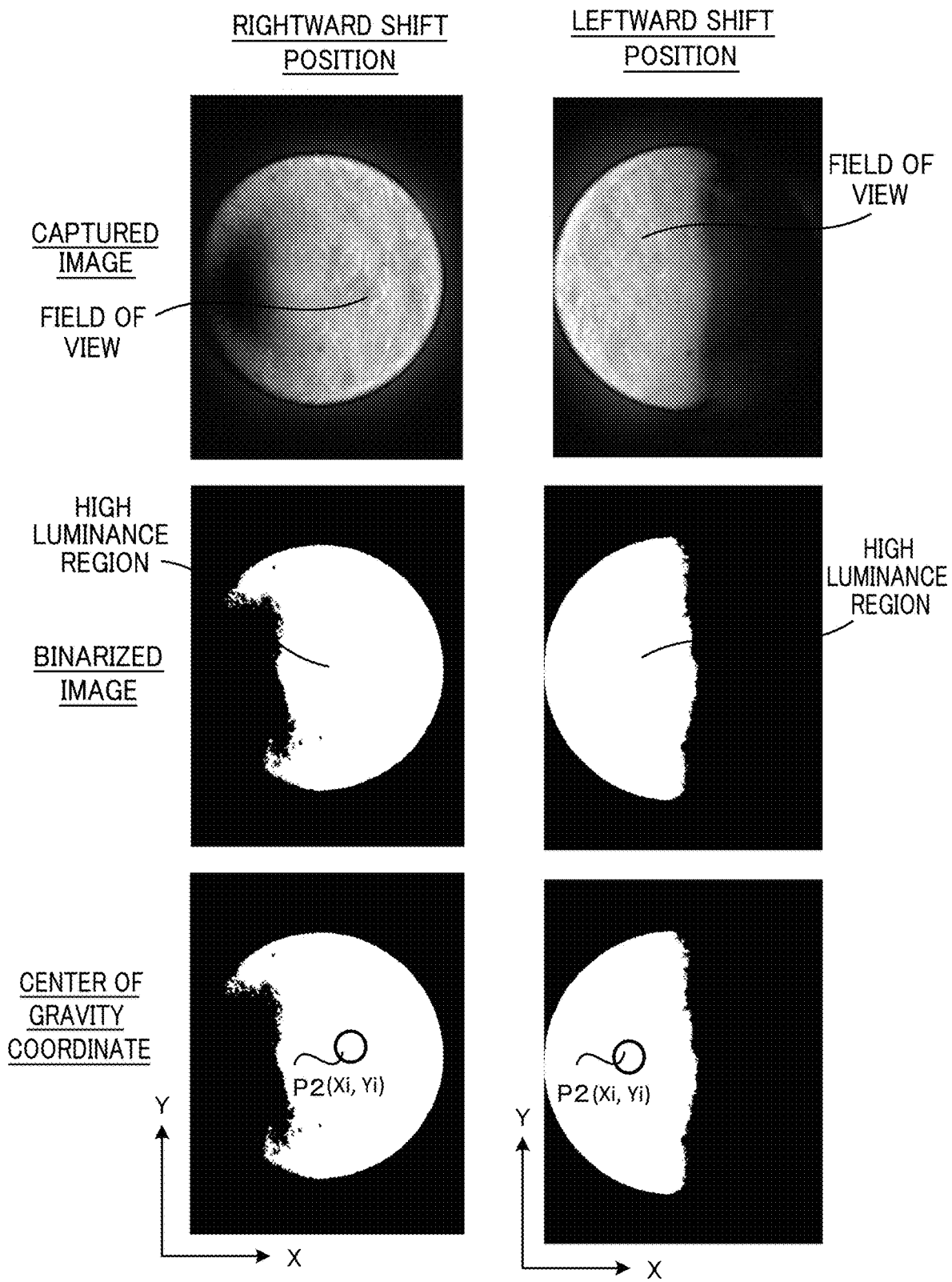
FIG. 7 is a diagram illustrating an example of a captured image captured at a position shifted from an appropriate position, a binarized image, and a center of gravity coordinate.

The captured image illustrated in FIG. 7 is a captured image captured at the rightward shift position and the leftward shift position illustrated in FIG. 6. In the captured image at the rightward shift position, a dark portion (vignetting) is seen on the left side of the field of view. In other words, the captured image captured by the imaging device 10 at the rightward shift position includes a visual field area having a shape in which the left side of a circle is missing. On the other hand, in the captured image at the leftward shift position, a dark portion (vignetting) is seen on the right side of the field of view. In other words, the captured image captured by the imaging device 10 at the leftward shift position includes a visual field area having a shape in which the right side of a circle is missing. Each center of gravity coordinate P2(Xi, Yi) is calculated as a center of gravity coordinate of the high luminance region specified from a binarized image. Note that, in a relationship between the center of gravity coordinate P2 of the visual field area at the rightward shift position and the center of gravity coordinate P1 (reference coordinate P1) of the visual field area at the appropriate position, Yi=Ys and Xi>Xs, and in a relationship between the center of gravity coordinate P2 of the visual field area at the leftward shift position and the center of gravity coordinate P1 (reference coordinate P1) of the visual field area at the appropriate position, Yi=Ys and Xi<Xs. In other words, in the case of Xi>Xs, since the imaging device 10 is shifted rightward from the appropriate position, the imaging device 10 is moved leftward. In the case of Xi<Xs, since the imaging device 10 is shifted leftward from the appropriate position, the imaging device 10 is moved rightward.

Figure 8:
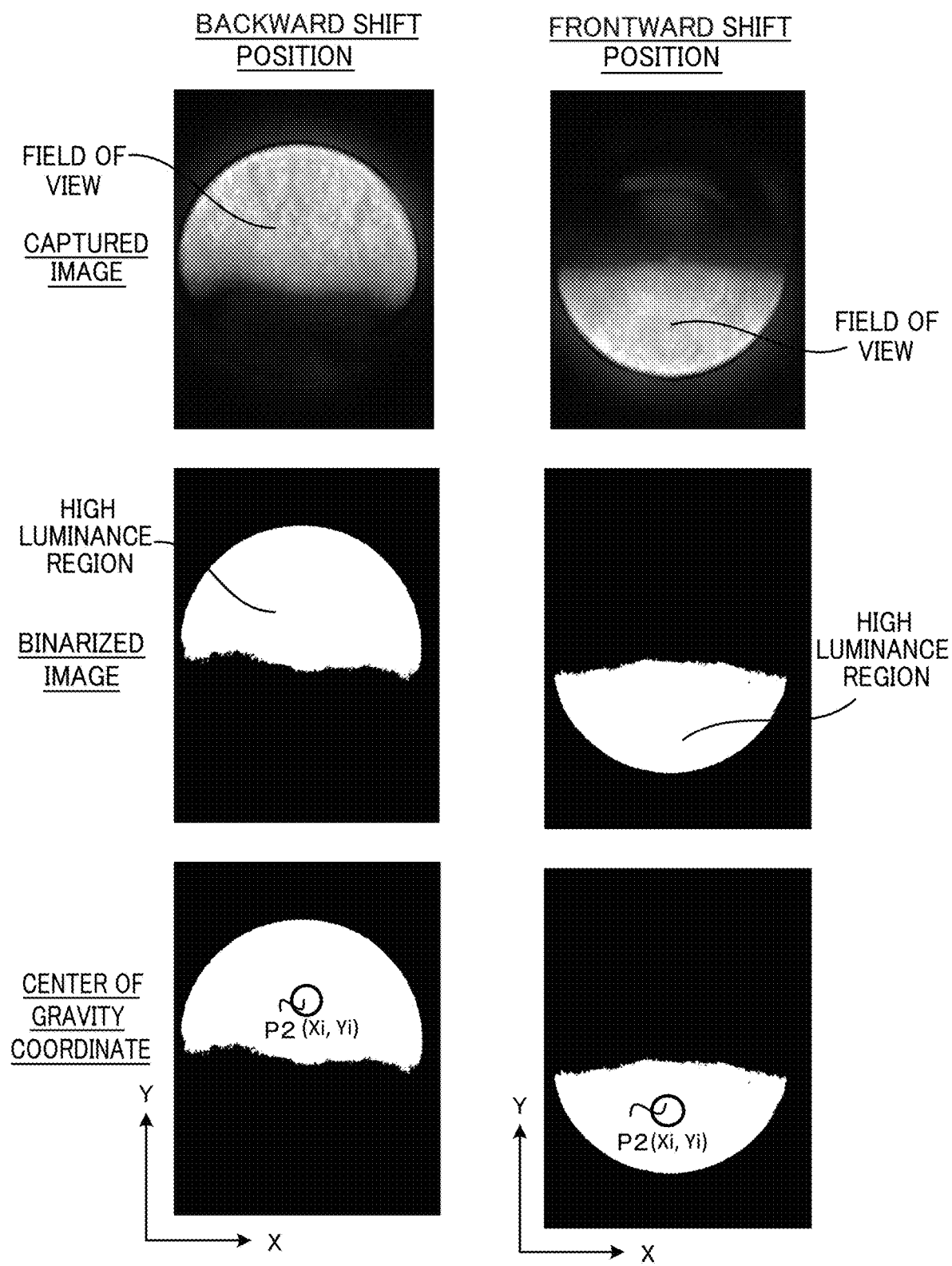
FIG. 8 is a diagram illustrating an example of a captured image captured at a position shifted from an appropriate position, a binarized image, and a center of gravity coordinate.

A captured image illustrated in FIG. 8 is a captured image captured at the backward shift position and the frontward shift position illustrated in FIG. 6. In the captured image at the backward shift position, a dark portion (vignetting) is seen on the lower side of the field of view. In other words, the captured image captured by the imaging device 10 at the backward shift position includes a visual field area having a shape in which the lower side of a circle is missing. On the other hand, in the captured image at the frontward shift position, a dark portion (vignetting) is seen on the upper side of the field of view. In other words, the captured image captured by the imaging device 10 at the frontward shift position includes a visual field area having a shape in which the upper side of a circle is missing. Each center of gravity coordinate P2(Xi, Yi) is calculated as a center of gravity coordinate of the high luminance region specified from a binarized image. Note that, in a relationship between the center of gravity coordinate P2 of the visual field area of the backward shift position and the center of gravity coordinate P1 (reference coordinate P1) of the visual field area of the appropriate position, Yi>Ys and Xi=Xs, and in a relationship between the center of gravity coordinate P2 of the visual field area of the frontward shift position and the center of gravity coordinate P1 (reference coordinate P1) of the visual field area of the appropriate position, Yi<Ys and Xi=Xs. In other words, in the case of Yi>Ys, since the imaging device 10 is shifted backward from the appropriate position, the imaging device 10 is moved frontward. In a case of Yi<Ys, since the imaging device 10 is shifted frontward from the appropriate position, the imaging device 10 is moved backward.

Figure 9:
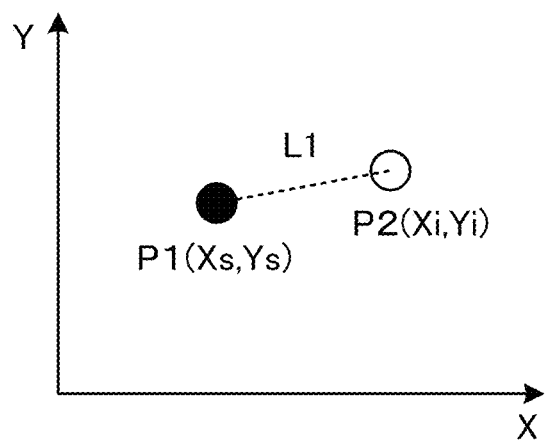
FIG. 9 is a diagram illustrating an example of a relationship between the reference coordinate and the center of gravity coordinate according to an embodiment.

FIG. 9 is a diagram illustrating an example of a relationship between the reference coordinate P1 and the center of gravity coordinate P2 according to the present embodiment. Note that the X and Y coordinate systems illustrated in FIG. 9 indicate a two-dimensional coordinate system set in the image displayed on the display unit 16.

As illustrated in FIG. 9, the guidance information creation unit 11D creates guidance information in a case where a distance L1 between the center of gravity coordinate P2(Xi, Yi) and the reference coordinate P1(Xs, Ys) is outside a predetermined range, and does not create guidance information in a case where the distance between the center of gravity coordinate P2(Xi, Yi) and the reference coordinate P1(Xs, Ys) is within the predetermined range. The distance L1 is calculated using the following Equation (1). Note that the predetermined range is a range in which an appropriate captured image can be obtained, and an appropriate value is determined according to the specifications of the imaging device 10 and the microscope 30, and the like.

[Equation 1]

$$L1=\sqrt{(Xi-Xs)^2+(Yi-Ys)^2} \quad (1)$$

Furthermore, the guidance information creation unit 11D may create the guidance information in a case where at least one of a first value representing an absolute value of a difference between the X coordinate Xi of the center of gravity coordinate P2(Xi, Yi) and the X coordinate Xs of the reference coordinate P1(Xs, Ys) and a second value representing an absolute value of a difference between the Y coordinate Yi of the center of gravity coordinate P2(Xi, Yi) and the Y coordinate Ys of the reference coordinate P1(Xs, Ys) is outside the predetermined range, and may not create the guidance information in a case where both the first value and the second value are within the predetermined range.

Figure 10:
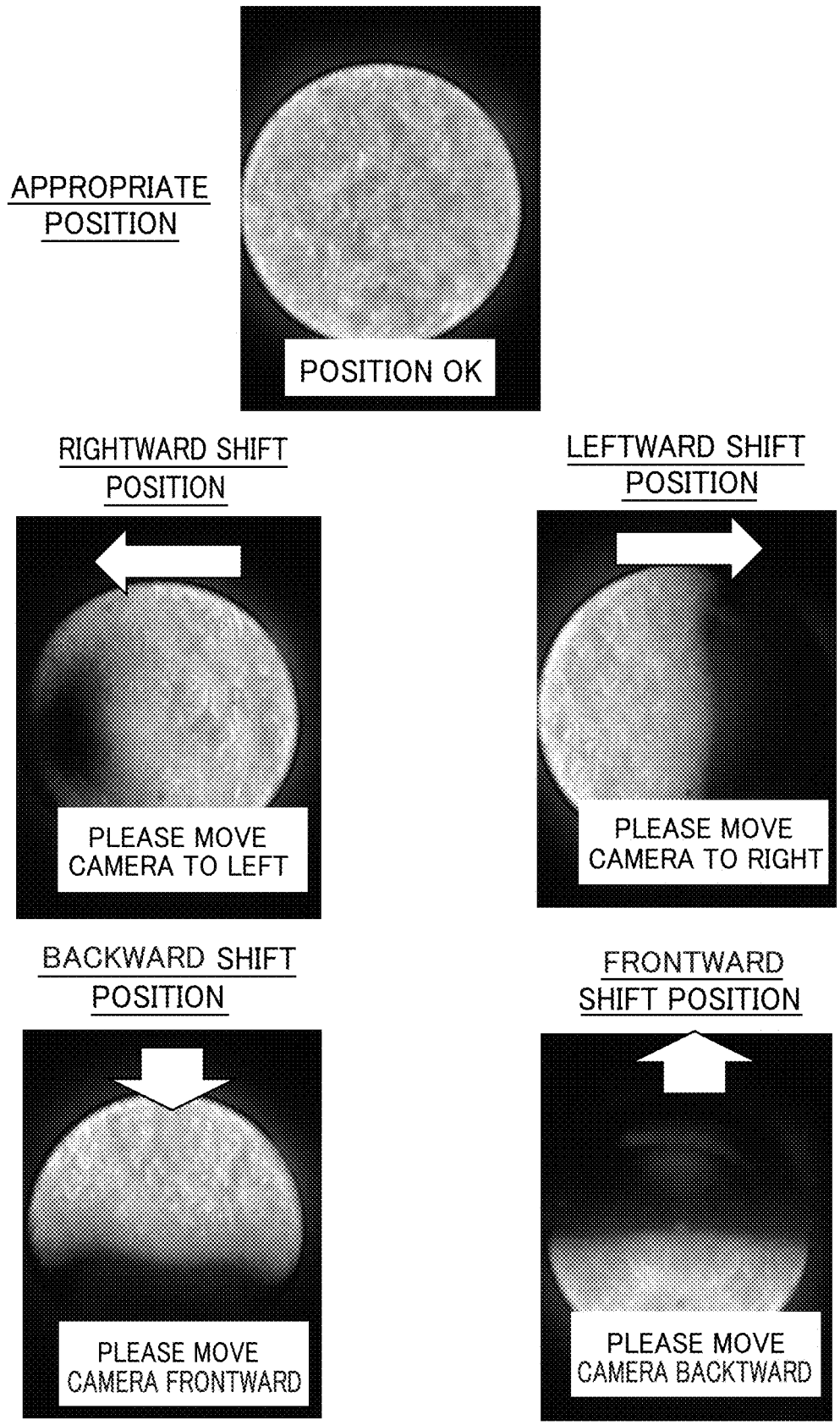
FIG. 10 is a diagram illustrating an example of guidance information displayed together with a captured image according to an embodiment.

Here, in a case where both of a first value representing an absolute value of a difference between the X coordinate Xi of the center of gravity coordinate P2(Xi, Yi) and the X coordinate Xs of the reference coordinate P1(Xs, Ys) and a second value representing an absolute value of a difference between the Y coordinate Yi of the center of gravity coordinate P2(Xi, Yi) and the Y coordinate Ys of the reference coordinate P1(Xs, Ys) are outside the predetermined range, for example, as illustrated in FIG. 10, the guidance information creation unit 11D creates the guidance information for separately adjusting the position of the camera 19 corresponding to the first value and the position of the camera 19 corresponding to the second value.

FIG. 10 is a diagram illustrating an example of guidance information displayed together with the captured image according to the present embodiment.

As illustrated in FIG. 10, the output unit 11E outputs a direction in which the camera 19 is guided to the display unit 16 as guidance information together with the captured image acquired by the image acquisition unit 11A. The direction to guide is represented by, for example, at least one of a character and a figure. In the example of FIG. 10, in the case of the "appropriate position", characters "position OK" are displayed. In the case of the "rightward shift position", characters "Please move the camera to the left" and a leftward arrow are displayed as the guidance information. The leftward arrow is an example of a figure. The figure referred to herein is not limited to an arrow, and may be a figure indicating a direction. Similarly, in the case of the "leftward shift position", characters "Please move the camera to the right" and a rightward arrow are displayed as the guidance information. In the case of the "backward shift position", characters "Please move the camera frontward" and a frontward arrow are displayed as the guidance information. In the case of the "frontward shift position", characters "Please move the camera backward" and a backward arrow are displayed as the guidance information. However, the back, front, left, and right directions here correspond to the back, front, left, and right directions illustrated in FIGS. 4 and 6.

Furthermore, in a case where both of a first value representing an absolute value of a difference between the X coordinate Xi of the center of gravity coordinate P2(Xi, Yi) and the X coordinate Xs of the reference coordinate P1(Xs, Ys) and a second value representing an absolute value of a difference between the Y coordinate Yi of the center of gravity coordinate P2(Xi, Yi) and the Y coordinate Ys of the reference coordinate P1(Xs, Ys) are outside the predetermined range, the guidance information creation unit 11D may create guidance information for simultaneously adjusting the position of the camera 19 corresponding to the first value and the position of the camera 19 corresponding to the second value. For example, in the case of a position shifted diagonally backward to the right, characters such as "Please move the camera diagonally frontward to the left" and a left diagonal frontward arrow are displayed as the guidance information. The guidance information is displayed in a similar relationship for other diagonal directions. Note that, in this case, the holder 20 has a structure in which the imaging device 10 is movable in a diagonal direction in addition to back, front, left, and right with respect to the microscope 30.

Furthermore, in a case where at least one of a first value representing an absolute value of a difference between the X coordinate Xi of the center of gravity coordinate P2(Xi, Yi) and the X coordinate Xs of the reference coordinate P1(Xs, Ys) and a second value representing an absolute value of a difference between the Y coordinate Yi of the center of gravity coordinate P2(Xi, Yi) and the Y coordinate Ys of the reference coordinate P1(Xs, Ys) is outside the predetermined range, for example, as illustrated in FIG. 11, the guidance information creation unit 11D may change a length of the figure according to the first value or the second value.

FIG. 11 is a diagram illustrating another example of the guidance information displayed together with the captured image according to the present embodiment.

For example, in the case of the "rightward shift position", the captured image and the guidance information illustrated in FIG. 11 are displayed. The guidance information is indicated by characters "Please move the camera to the left" and a leftward arrow. In the example of FIG. 11, a length of the arrow in a case where the first value is large is longer than a length of the arrow in a case where the first value is small. By changing the length of the arrow, it is possible to visually grasp a degree of an adjustment amount of the camera position.

Next, actions of the imaging device 10 according to the first embodiment will be described with reference to FIGS. 12 to 16.

Figure 12:
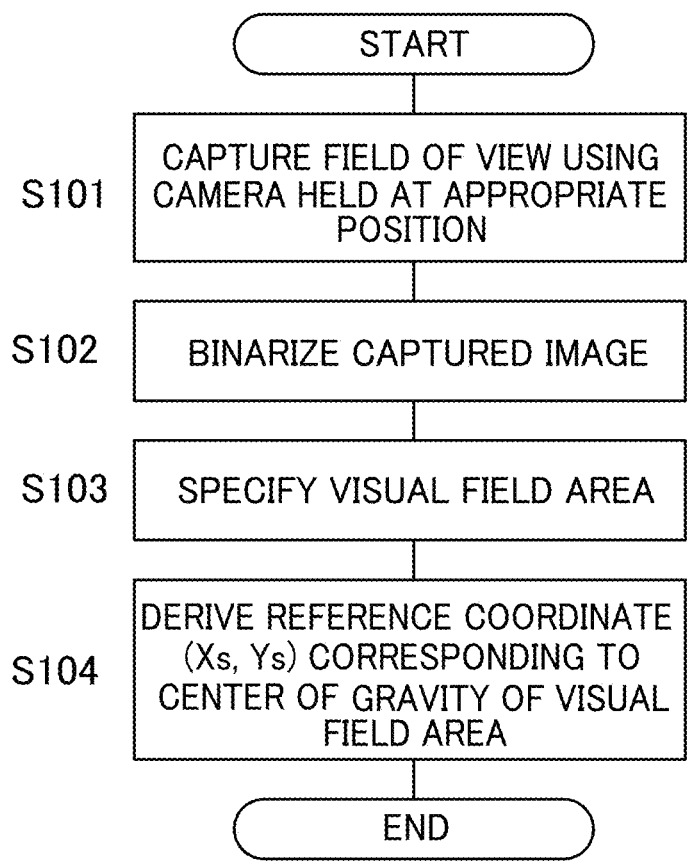
FIG. 12 is a flowchart illustrating an example of a flow of reference coordinate deriving processing by the guidance program according to the first embodiment.

FIG. 12 is a flowchart illustrating an example of a flow of reference coordinate deriving processing by the guidance program 15A according to the first embodiment.

When execution of the reference coordinate deriving processing by the guidance program 15A is instructed, the CPU 11 of the imaging device 10 writes the guidance program 15A stored in the ROM 12 or the storage unit 15 into the RAM 13 to execute the processing.

In step S101 of FIG. 12, the CPU 11 captures the field of view of the microscope 30 as illustrated in FIG. 5 described above as an example using the camera 19 of the imaging device 10 held at the appropriate position by the holder 20.

In step S102, as an example, as illustrated in FIG. 5 described above, the CPU 11 binarizes the captured image obtained by capturing in step S101 to generate a binarized image.

In step S103, as an example, as illustrated in FIG. 5 described above, the CPU 11 specifies a high luminance region from the binarized image generated in step S102 and specifies a visual field area.

In step S104, as an example, as illustrated in FIG. 5 described above, the CPU 11 derives a reference coordinate P1(Xs, Ys) corresponding to a center of gravity of the visual field area specified in step S103, and ends the reference coordinate deriving processing by the guidance program 15A.

Figure 13:
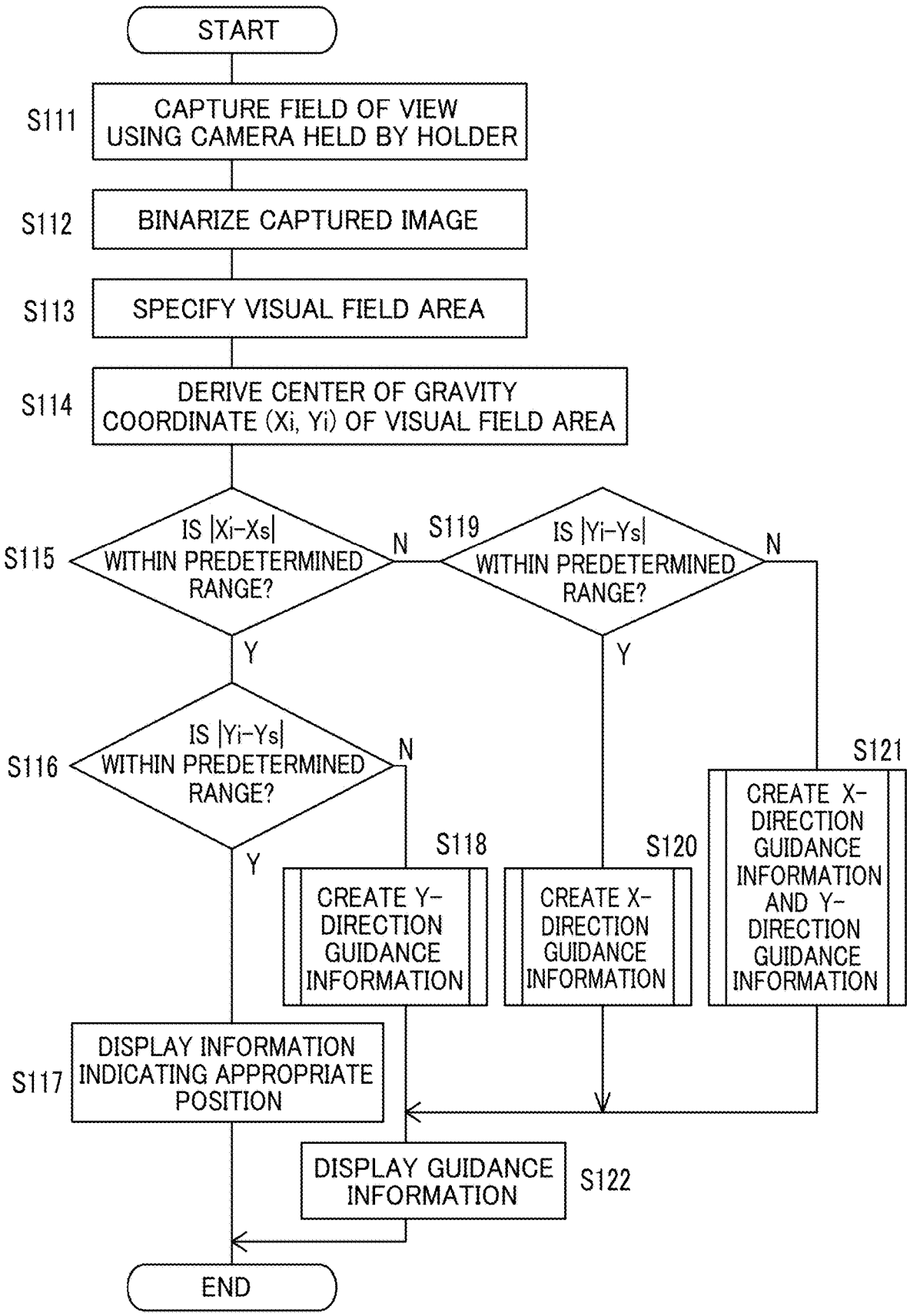
FIG. 13 is a flowchart illustrating an example of a flow of guidance information display processing by a guidance program according to the first embodiment.

FIG. 13 is a flowchart illustrating an example of a flow of guidance information display processing by the guidance program 15A according to the first embodiment.

When execution of the guidance information display processing by the guidance program 15A is instructed, the CPU 11 of the imaging device 10 writes the guidance program 15A stored in the ROM 12 or the storage unit 15 into the RAM 13 to execute the processing.

In step S111 of FIG. 13, the CPU 11 captures the field of view of the microscope 30 as illustrated in FIGS. 7 and 8 described above as an example using the camera 19 of the imaging device 10 held by the holder 20.

In step S112, as an example, as illustrated in FIGS. 7 and 8 described above, the CPU 11 binarizes the captured image obtained by capturing in step S111 to generate a binarized image.

In step S113, as an example, as illustrated in FIGS. 7 and 8 described above, the CPU 11 specifies a high luminance region from the binarized image generated in step S112 and specifies a visual field area.

In step S114, as an example, as illustrated in FIGS. 7 and 8 described above, the CPU 11 derives a center of gravity coordinate P2(Xi, Yi) corresponding to a center of gravity of the visual field area specified in step S113.

In step S115, as an example, as illustrated in FIG. 9 described above, the CPU 11 determines whether or not |Xi−Xs|, which is a first value representing an absolute value of a difference between the X coordinate Xi of the center of gravity coordinate P2(Xi, Yi) and the X coordinate Xs of the reference coordinate P1(Xs, Ys), is within a predetermined range. In a case where it is determined that |Xi−Xs| is within the predetermined range (in the case of positive determination), the processing proceeds to step S116, and in a case where it is determined that |Xi−Xs| is outside the predetermined range (in the case of negative determination), the processing proceeds to step S119.

In step S116, as an example, as illustrated in FIG. 9 described above, the CPU 11 determines whether or not |Yi−Ys|, which is a second value representing an absolute value of a difference between the Y coordinate Yi of the center of gravity coordinate P2(Xi, Yi) and the Y coordinate Ys of the reference coordinate P1(Xs, Ys), is within a predetermined range. In a case where it is determined that |Yi−Ys| is within the predetermined range (in the case of positive determination), the processing proceeds to step S117, and in a case where it is determined that |Yi−Ys| is outside the predetermined range (in the case of negative determination), the processing proceeds to step S118.

In step S117, as an example, as illustrated in FIG. 10 described above, the CPU 11 displays information (for example, "position OK") indicating that the imaging device 10 is at the appropriate position on the display unit 16, and ends the guidance information display processing by the guidance program 15A.

On the other hand, in step S118, the CPU 11 creates the Y-direction guidance information. A Y-direction guidance information creation subroutine will be described with reference to FIG. 14.

Figure 14:
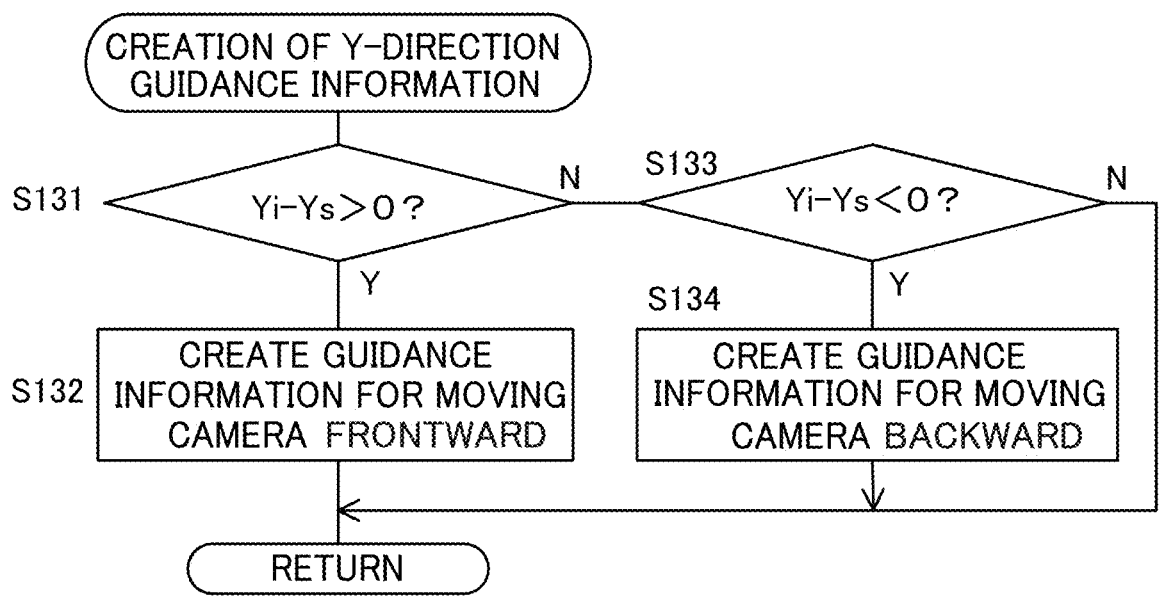
FIG. 14 is a flowchart illustrating an example of a flow of processing by a Y-direction guidance information creation subroutine executed in step S118 of FIG. 13.

FIG. 14 is a flowchart illustrating an example of a flow of processing by a Y-direction guidance information creation subroutine executed in step S118 of FIG. 13.

In step S131 of FIG. 14, the CPU 11 determines whether or not Yi−Ys >0. In a case where it is determined that Yi−Ys >0 (in the case of positive determination), the processing proceeds to step S132, and in a case where it is determined that Yi−Ys >0 is not (in the case of negative determination), the processing proceeds to step S133.

In step S132, the CPU 11 sets the center of gravity coordinates P2(Xi, Yi) as the backward shift position, creates guidance information for moving the camera 19 frontward as illustrated in FIG. 10 described above as an example, and returns to step S118 in FIG. 13.

On the other hand, in step S133, the CPU 11 determines whether or not Yi−Ys<0. In a case where it is determined that Yi−Ys<0 (in the case of positive determination), the processing proceeds to step S134, and in a case where it is determined that Yi−Ys<0 is not (in the case of negative determination), the processing proceeds to the return.

In step S134, the CPU 11 sets the center of gravity coordinates P2(Xi, Yi) as the frontward shift position, creates guidance information for moving the camera 19 backward as illustrated in FIG. 10 described above as an example, and returns to step S118 in FIG. 13.

Returning to FIG. 13, in step S119, as an example, the CPU 11 determines whether or not |Yi−Ys|, which is the second value, is within a predetermined range as illustrated in FIG. 9 described above. In a case where it is determined that |Yi−Ys| is within the predetermined range (in the case of positive determination), the processing proceeds to step S120, and in a case where it is determined that |Yi−Ys| is outside the predetermined range (in the case of negative determination), the processing proceeds to step S121.

In step S120, the CPU 11 creates X-direction guidance information. An X-direction guidance information creation subroutine will be described with reference to FIG. 15.

Figure 15:
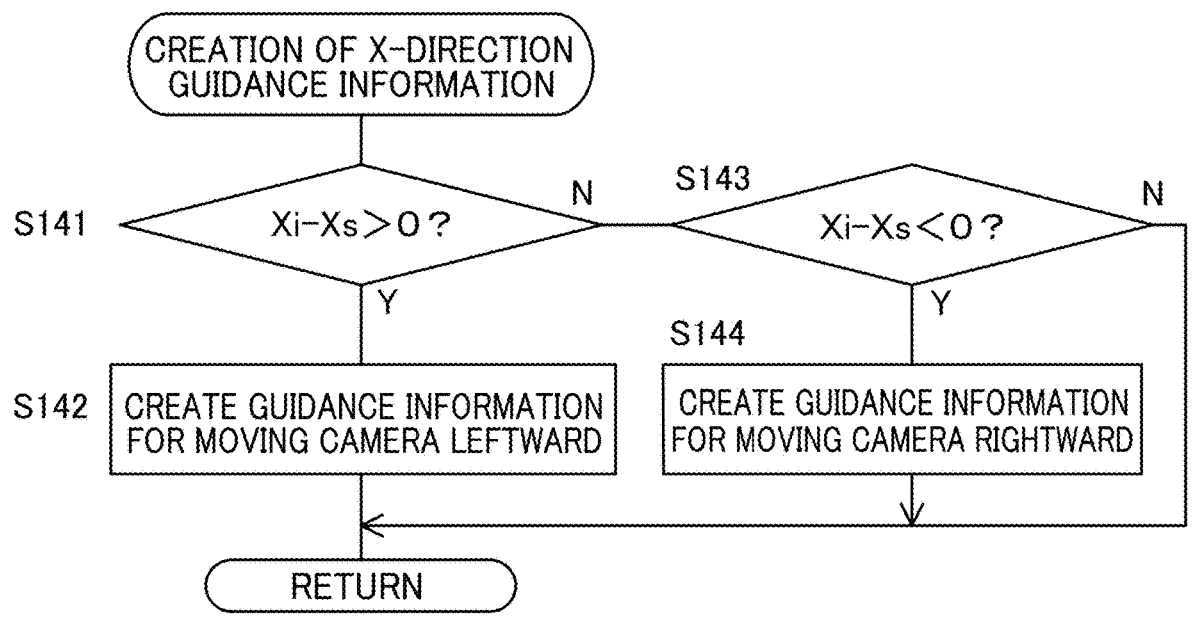
FIG. 15 is a flowchart illustrating an example of a flow of processing by an X-direction guidance information creation subroutine executed in step S120 of FIG. 13.

FIG. 15 is a flowchart illustrating an example of a flow of processing by an X-direction guidance information creation subroutine executed in step S120 of FIG. 13.

In step S141 of FIG. 15, the CPU 11 determines whether or not Xi−Xs >0. In a case where it is determined that Xi−Xs >0 (in the case of positive determination), the processing proceeds to step S142, and in a case where it is determined that Xi−Xs >0 is not (in the case of negative determination), the processing proceeds to step S143.

In step S142, the CPU 11 sets the center of gravity coordinates P2(Xi, Yi) to the rightward shift position, creates guidance information for moving the camera 19 leftward as illustrated in FIG. 10 described above as an example, and returns to step S120 in FIG. 13.

On the other hand, in step S143, the CPU 11 determines whether or not Xi−Xs<0. In a case where it is determined that Xi−Xs<0 (in the case of positive determination), the processing proceeds to step S144, and in a case where it is determined that Xi−Xs<0 is not (in the case of negative determination), the processing proceeds to the return.

In step S144, the CPU 11 sets the center of gravity coordinates P2(Xi, Yi) to the leftward shift position, creates guidance information for moving the camera 19 rightward as illustrated in FIG. 10 described above as an example, and returns to step S120 in FIG. 13.

Returning to FIG. 13, in step S121, the CPU 11 creates the X-direction guidance information and the Y-direction guidance information. An X-direction guidance information and Y-direction guidance information creation subroutine will be described with reference to FIG. 16.

Figure 16:
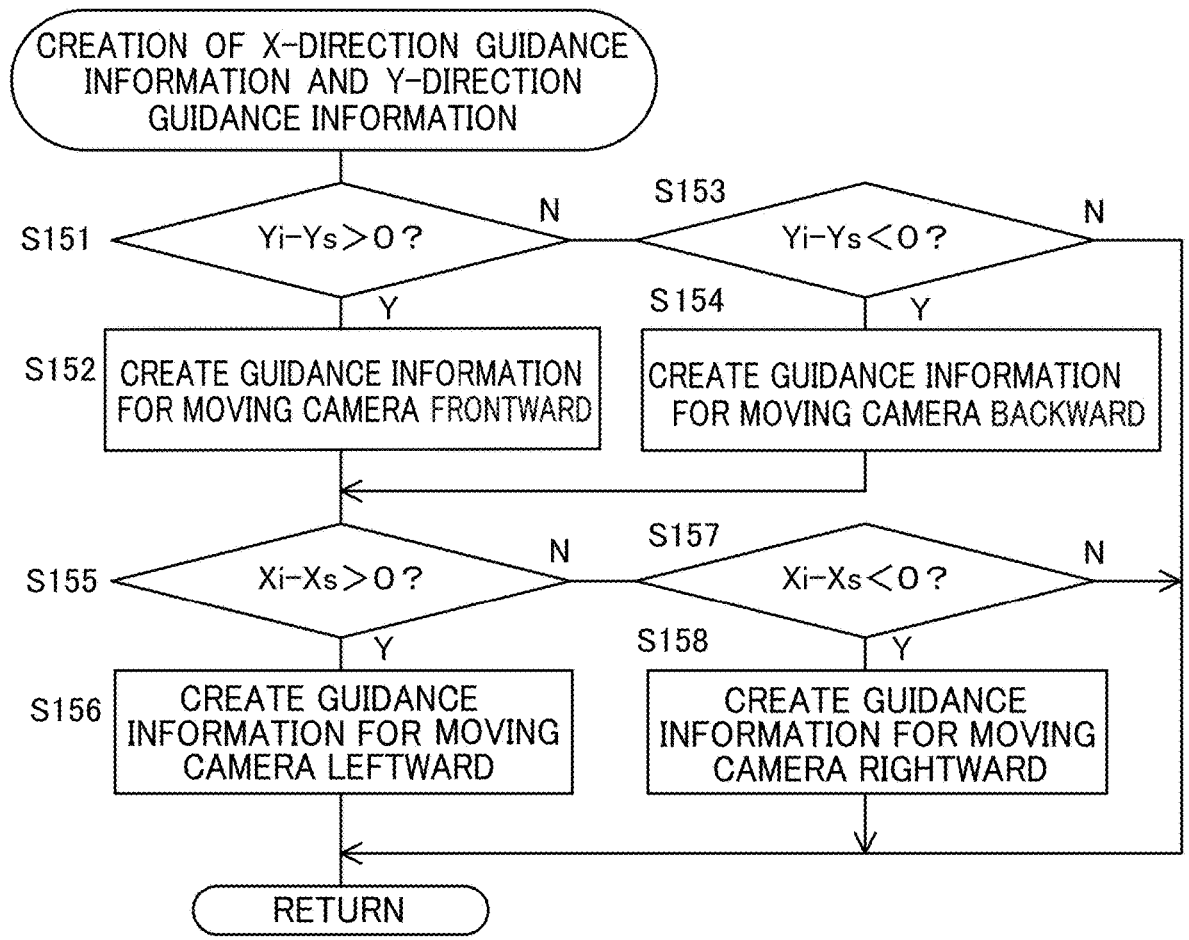
FIG. 16 is a flowchart illustrating an example of a flow of processing by an X-direction guidance information and Y-direction guidance information creation subroutine executed in step S121 of FIG. 13.

FIG. 16 is a flowchart illustrating an example of a flow of processing by an X-direction guidance information and Y-direction guidance information creation subroutine executed in step S121 of FIG. 13.

In step S151 of FIG. 16, the CPU 11 determines whether or not Yi−Ys >0. In a case where it is determined that Yi−Ys >0 (in the case of positive determination), the processing proceeds to step S152, and in a case where it is determined that Yi−Ys >0 (in the case of negative determination), the processing proceeds to step S153.

In step S152, the CPU 11 creates guidance information for moving the camera 19 frontward as illustrated in FIG. 10 described above as an example with the center of gravity coordinate P2(Xi, Yi) as the backward shift position.

On the other hand, in step S153, the CPU 11 determines whether or not Yi−Ys<0. In a case where it is determined that Yi−Ys<0 (in the case of positive determination), the processing proceeds to step S154, and in a case where it is determined that Yi−Ys<0 is not (in the case of negative determination), the processing proceeds to the return.

In step S154, the CPU 11 creates guidance information for moving the camera 19 backward as illustrated in FIG. 10 described above as an example with the center of gravity coordinate P2(Xi, Yi) as the frontward shift position.

Next, in step S155, the CPU 11 determines whether or not Xi−Xs >0. In a case where it is determined that Xi−Xs >0 (in the case of positive determination), the processing proceeds to step S156, and in a case where it is determined that Xi−Xs >0 is not (in the case of negative determination), the processing proceeds to step S157.

In step S156, the CPU 11 sets the center of gravity coordinate P2(Xi, Yi) to the rightward shift position, creates guidance information for moving the camera 19 leftward as illustrated in FIG. 10 described above as an example, and returns to step S121 in FIG. 13.

On the other hand, in step S157, the CPU 11 determines whether or not Xi−Xs<0. In a case where it is determined that Xi−Xs<0 (in the case of positive determination), the processing proceeds to step S158, and in a case where it is determined that Xi−Xs<0 is not (in the case of negative determination), the processing proceeds to the return.

In step S158, the CPU 11 sets the center of gravity coordinate P2(Xi, Yi) to the leftward shift position, creates guidance information for moving the camera 19 rightward as illustrated in FIG. 10 described above as an example, and returns to step S121 in FIG. 13.

Returning to FIG. 13, in step S122, the CPU 11 displays the guidance information created in step S118, step S120, or step S121 on the display unit 16, and ends the guidance information display processing by the guidance program 15A.

As described above, according to the present embodiment, in a case where the optical axis of the eyepiece lens of the microscope and the optical axis of the camera lens are mismatched, the direction in which the camera is moved to the appropriate position is displayed as the guidance information. The user only needs to move the camera according to the guidance information, and can easily adjust the position of the camera with respect to the eyepiece lens of the microscope.

Second Embodiment

In the first embodiment, a mode in which the user moves the camera to the appropriate position according to the guidance information has been described. In the second embodiment, a mode in which the camera is automatically moved to the appropriate position by controlling a motor by the guidance information will be described.

Figure 17:
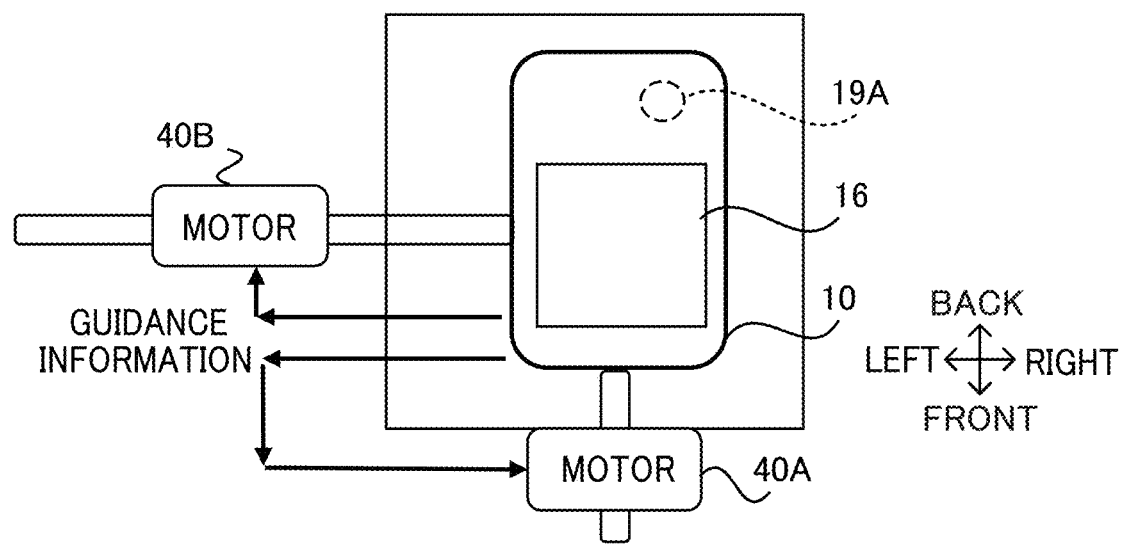
FIG. 17 is a diagram schematically illustrating configurations of an imaging device and a motor according to a second embodiment.

FIG. 17 is a diagram schematically illustrating configurations of an imaging device 10 and motors 40A and 40B according to the second embodiment.

As illustrated in FIG. 17, the output unit 11E according to the present embodiment outputs the guidance information to the motors 40A and 40B that adjust the position of the camera 19. The motor 40A is a motor that moves the imaging device 10 in the back-front direction, and the motor 40B is a motor that moves the imaging device 10 in the right-left direction. The guidance information output to the motors 40A and 40B is information including a moving direction and a moving amount based on a shift amount between the reference coordinate P1(Xs, Ys) and the center of gravity coordinate P2(Xi, Yi).

Next, the action of the imaging device 10 according to the second embodiment will be described with reference to FIG. 18.

Figure 18:
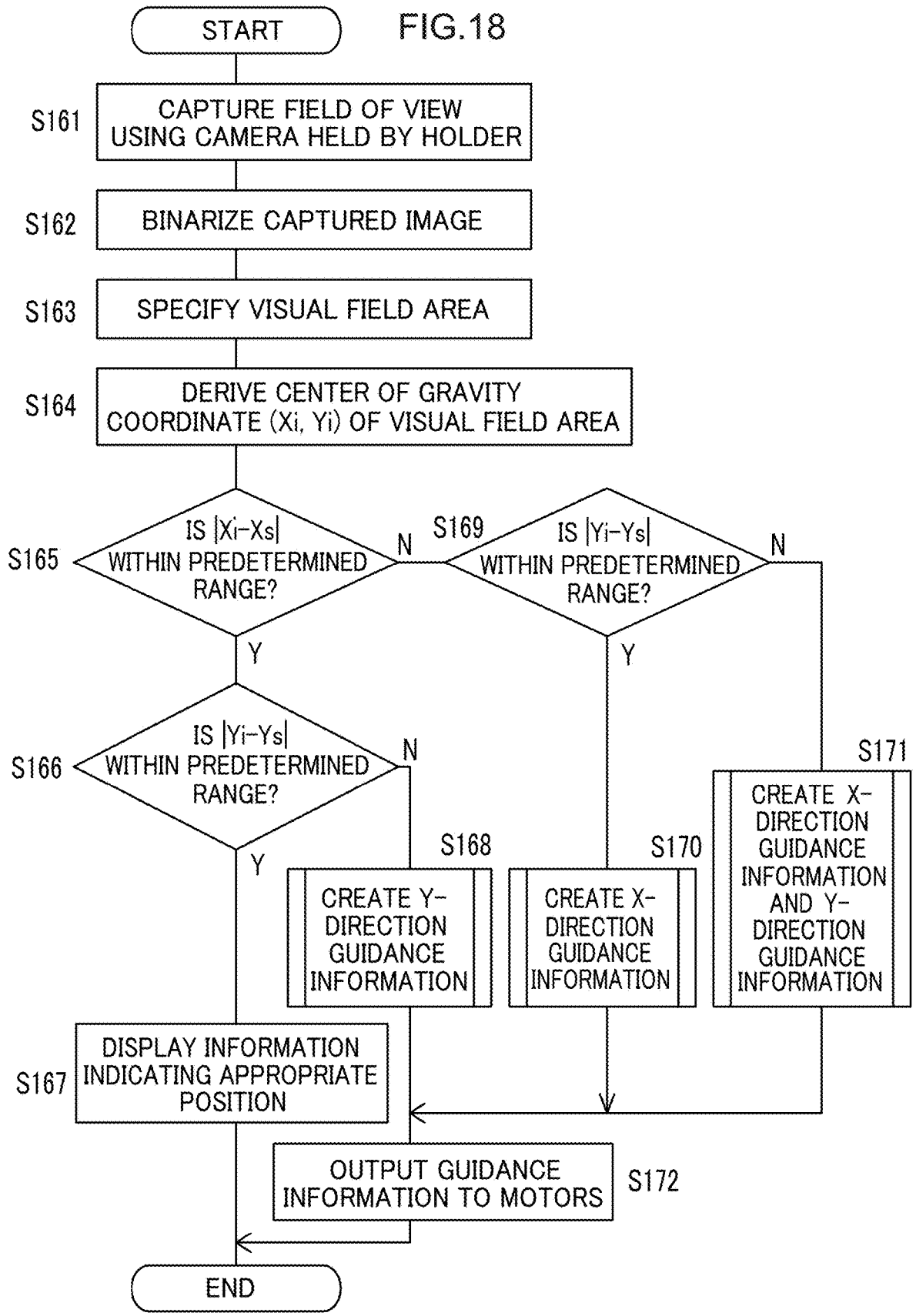
FIG. 18 is a flowchart illustrating an example of a flow of guidance information output processing by a guidance program according to the second embodiment.

FIG. 18 is a flowchart illustrating an example of a flow of guidance information output processing by the guidance program 15A according to the second embodiment.

When execution of the guidance information output processing by the guidance program 15A is instructed, the CPU 11 of the imaging device 10 writes the guidance program 15A stored in the ROM 12 or the storage unit 15 into the RAM 13 to execute the processing.

Since the processing of steps S161 to S171 of FIG. 18 is similar to the processing of steps S111 to S121 illustrated in FIG. 13 described above, the repeated description thereof will be omitted. In the flow of FIG. 13, the guidance information is displayed and output on the display unit 16, whereas in the flow of FIG. 18, the guidance information is output to the motors 40A and 40B.

That is, in step S172 of FIG. 18, the CPU 11 outputs the guidance information created in step S168, step S170, or step S171 to the motors 40A and 40B as illustrated in FIG. 17 described above as an example, and ends the guidance information output processing by the guidance program 15A.

As described above, according to the present embodiment, in a case where the optical axis of the eyepiece lens of the microscope and the optical axis of the camera lens are mismatched, the camera can be automatically moved to the appropriate position by controlling the motors by the guidance information. Therefore, it is possible to easily adjust the position of the camera with respect to the eyepiece lens of the microscope.

Third Embodiment

In a third embodiment, a form in which a guidance program is provided not in an imaging device but in an information processing device connected to the imaging device via a network will be described.

Figure 19:
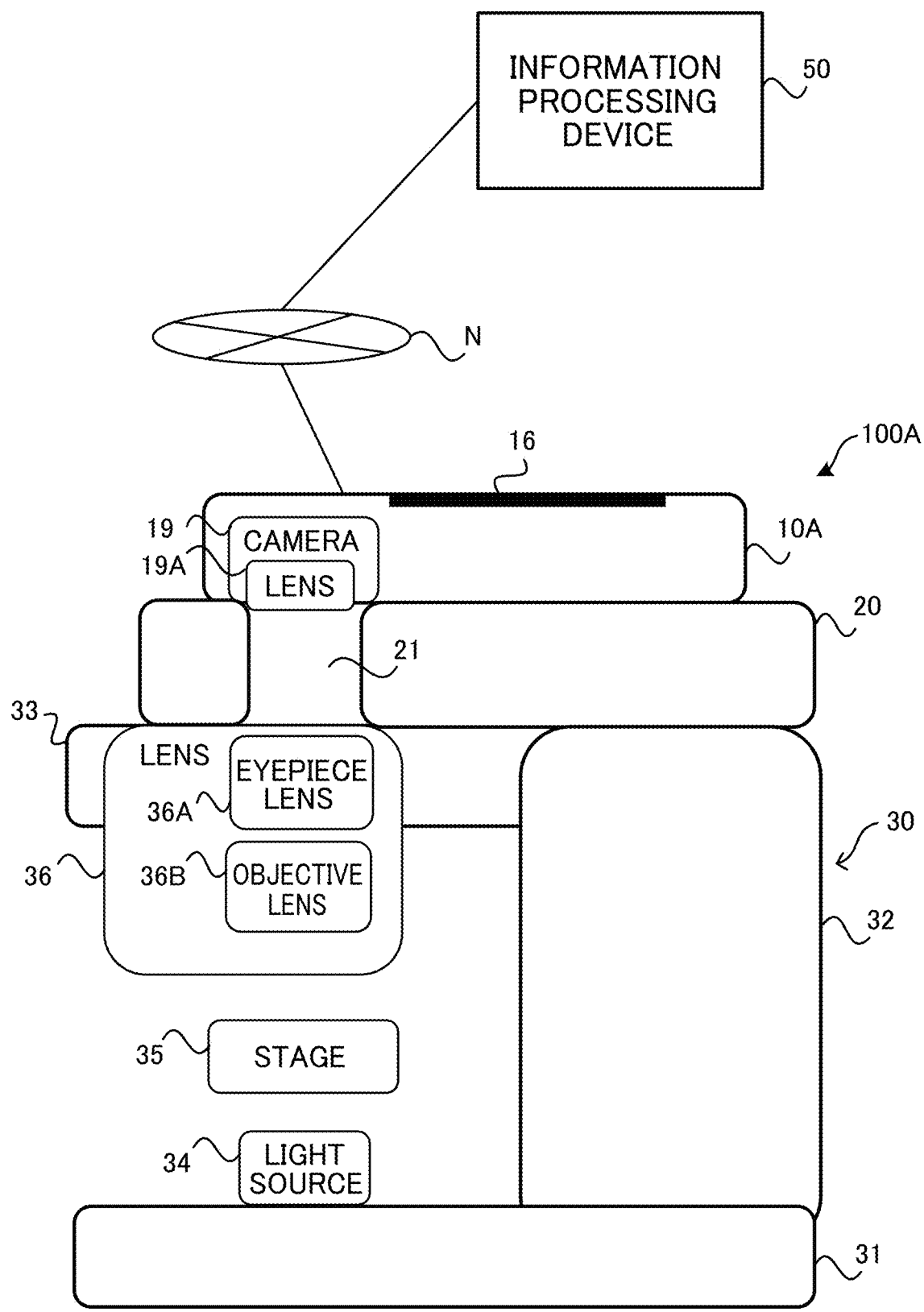
FIG. 19 is a diagram schematically illustrating an example of a microscope device and an information processing device according to a third embodiment.

FIG. 19 is a diagram schematically illustrating an example of a microscope device 100A and an information processing device 50 according to the third embodiment.

As illustrated in FIG. 19, the microscope device 100A includes an imaging device 10A. The imaging device 10A and the information processing device 50 are connected via a network N, and the information processing device 50 can be accessed by the imaging device 10 via the network N. As the information processing device 50, for example, a general-purpose computer device such as a server computer or a personal computer is applied.

Figure 20:
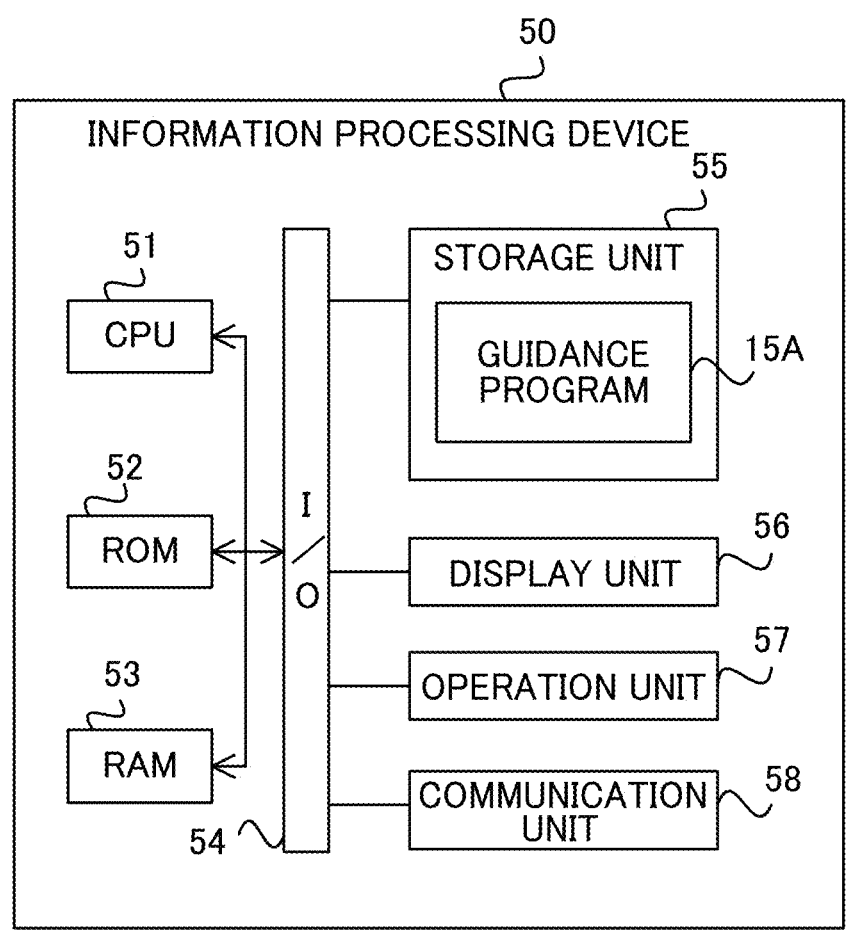
FIG. 20 is a block diagram illustrating an example of an electrical configuration of the information processing device according to the third embodiment.

FIG. 20 is a block diagram illustrating an example of an electrical configuration of an information processing device 50 according to the third embodiment.

As illustrated in FIG. 20, the information processing device 50 according to the present embodiment includes a CPU 51, a ROM 52, a RAM 53, an I/O 54, a storage unit 55, a display unit 56, an operation unit 57, and a communication unit 58.

The CPU 51, the ROM 52, the RAM 53, and the I/O 54 constitute a control unit. Each unit of the CPU 51, the ROM 52, the RAM 53, and the I/O 54 is connected via a bus.

Each functional unit including the storage unit 55, the display unit 56, the operation unit 57, and the communication unit 58 is connected to the I/O 54. These functional units can communicate with the CPU 51 via the I/O 54.

The control unit may be configured as a sub-control unit that controls a part of the operation of the information processing device 50, or may be configured as a part of a main control unit that controls the entire operation of the information processing device 50.

As the storage unit 55, for example, an HDD, an SSD, a flash memory, or the like is used. The storage unit 55 stores the guidance program 15A according to the present embodiment. Note that the guidance program 15A may be stored in the ROM 52.

As the display unit 56, for example, a liquid crystal display (LCD), an organic EL display, or the like is used. The display unit 56 may integrally include a touch panel. The operation unit 57 is provided with an operation input device such as a keyboard and a mouse. The display unit 56 and the operation unit 57 receive various instructions from a user of the information processing device 50. The display unit 56 displays various types of information such as a result of processing executed in response to an instruction received from the user and a notification for the processing.

The communication unit 58 is connected to a network N such as the Internet, a LAN, or a WAN, and can communicate with the imaging device 10A via the network N.

The guidance program 15A according to the present embodiment is stored not in the imaging device 10A but in the information processing device 50. In this case, a captured image obtained by capturing the field of view of the microscope 30 is transmitted from the imaging device 10A to the information processing device 50.

The CPU 51 of the information processing device 50 according to the present embodiment functions as each unit illustrated in FIG. 3 described above by writing and executing the guidance program 15A stored in the storage unit 55 or the ROM 52 into the RAM 53. That is, the CPU 51 of the information processing device 50 functions as the image acquisition unit 11A, the specification unit 11B, the center of gravity coordinate acquisition unit 11C, the guidance information creation unit 11D, and the output unit 11E. The image acquisition unit 11A according to the present embodiment acquires a captured image obtained by capturing the field of view of the microscope 30, which is transmitted from the imaging device 10A, and the output unit 11E outputs guidance information to the imaging device 10A. Since the specification unit 11B, the center of gravity coordinate acquisition unit 11C, and the guidance information creation unit 11D are as described above with reference to FIG. 3, repeated description is omitted. However, the reference coordinate P1(Xs, Ys) corresponding to the appropriate position is transmitted from the imaging device 10A to the information processing device 50 in advance and held in the information processing device 50.

As described above, according to the present embodiment, the guidance program may not be provided in each imaging device, and the guidance information can be acquired from the information processing device via the network.

Note that, in each of the above embodiments, a processor refers to a processor in a broad sense, and includes a general-purpose processor (for example, a central processing unit (CPU), and the like) or a dedicated processor (for example, a graphics processing unit (GPU), an application specific integrated circuit (ASIC), a field programmable gate array (FPGA), a programmable logic device, and the like).

Furthermore, the operation of the processor in each of the above embodiments may be performed not only by one processor but also by cooperation of a plurality of processors existing at physically separated positions. Furthermore, the order of each operation of the processor is not limited to the order described in each of the embodiments, and may be changed if appropriate.

The imaging device, the microscope device, and the information processing device according to the embodiments have been described above by way of example. The embodiments may be in the form of a non-transitory computer-readable storage medium storing the guidance program for causing a computer to execute a function of each unit included in the imaging device or the information processing device.

In addition, the configurations of the imaging device, the microscope device, and the information processing device described in the embodiments are merely examples, and may be changed according to the situation without departing from the gist.

Furthermore, the flow of processing of the program described in the embodiments is also an example, and unnecessary steps may be deleted, new steps may be added, or the processing order may be changed within a scope not departing from the gist.

Furthermore, in the embodiments, a case where the processing according to the embodiments is realized by a software configuration using a computer by executing a program has been described, but the present disclosure is not limited thereto. The embodiments may be realized by, for example, a hardware configuration or a combination of a hardware configuration and a software configuration.

Regarding the above embodiments, the following is further disclosed.

A guidance program according to a first aspect is a guidance program for guiding a camera held by a holder holding the camera that captures a field of view of a microscope through an eyepiece lens of the microscope to an appropriate holding position with respect to an optical axis of the eyepiece lens, the guidance program causing a computer to function as: an image acquisition unit that acquires, from the camera, an image of the field of view captured by the camera held by the holder; a specification unit that specifies a visual field area in the image, the visual field area corresponding to the field of view; a center of gravity coordinate acquisition unit that obtains a center of gravity coordinate of the visual field area; a guidance information creation unit that creates guidance information to guide the camera to the holding position based on a comparison between the center of gravity coordinate and a reference coordinate corresponding to a center of gravity of the visual field area obtained from an image captured by the camera held at the holding position; and an output unit that outputs the guidance information.

A guidance program according to a second aspect is the guidance program according to the first aspect, in which the holding position includes a holding position of the camera at which an optical axis of the eyepiece lens and an optical axis of the camera are matched.

A guidance program according to a third aspect is the guidance program according to the first aspect, in which the guidance information creation unit creates the guidance information in a case in which a distance between the center of gravity coordinate and the reference coordinate is outside a predetermined range, and does not create the guidance information in a case where the distance between the center of gravity coordinate and the reference coordinate is within the predetermined range.

A guidance program according to a fourth aspect is the guidance program according to any one of the first to third aspects, in which each of the center of gravity coordinate and the reference coordinate is represented by a first coordinate and a second coordinate representing a two-dimensional position on an image, and the guidance information creation unit creates the guidance information in a case in which at least one of a first value representing an absolute value of a difference between the first coordinate of the center of gravity coordinate and the first coordinate of the reference coordinate or a second value representing an absolute value of a difference between the second coordinate of the center of gravity coordinate and the second coordinate of the reference coordinate is outside a predetermined range, and the guidance information creation unit does not create the guidance information in a case in which both of the first value and the second value are within the predetermined range.

A guidance program according to a fifth aspect is the guidance program according to any one of the first to third aspects, in which each of the center of gravity coordinate and the reference coordinate is represented by a first coordinate and a second coordinate representing a two-dimensional position on an image, and in a case in which both of a first value representing an absolute value of a difference between the first coordinate of the center of gravity coordinate and the first coordinate of the reference coordinate and a second value representing an absolute value of a difference between the second coordinate of the center of gravity coordinate and the second coordinate of the reference coordinate are outside a predetermined range, the guidance information creation unit creates the guidance information for separately adjusting a position of the camera corresponding to the first value and a position of the camera corresponding to the second value.

A guidance program according to a sixth aspect is the guidance program according to any one of the first to third aspects, in which each of the center of gravity coordinate and the reference coordinate is represented by a first coordinate and a second coordinate representing a two-dimensional position on an image, and in a case in which both of a first value representing an absolute value of a difference between the first coordinate of the center of gravity coordinate and the first coordinate of the reference coordinate and a second value representing an absolute value of a difference between the second coordinate of the center of gravity coordinate and the second coordinate of the reference coordinate are outside a predetermined range, the guidance information creation unit creates the guidance information for simultaneously adjusting a position of the camera corresponding to the first value and a position of the camera corresponding to the second value.

A guidance program according to a seventh aspect is the guidance program according to any one of the first to third aspects, in which each of the center of gravity coordinate and the reference coordinate is represented by a first coordinate and a second coordinate representing a two-dimensional position on an image, the guidance information is represented as a figure representing a direction in which the camera is guided, and in a case in which at least one of a first value representing an absolute value of a difference between the first coordinate of the center of gravity coordinate and the first coordinate of the reference coordinate and a second value representing an absolute value of a difference between the second coordinate of the center of gravity coordinate and the second coordinate of the reference coordinate is outside a predetermined range, the guidance information creation unit changes a length of the figure in accordance with the first value or the second value.

A guidance program according to an eighth aspect is the guidance program according to any one of the first to seventh aspects, in which the output unit outputs a direction in which the camera is to be guided to a display unit as the guidance information together with the image acquired by the image acquisition unit.

A guidance program according to a ninth aspect is the guidance program according to the eighth aspect, in which the direction of guidance is represented by at least one of a character or a figure.

A guidance program according to a tenth aspect is the guidance program according to any one of the first to seventh aspects, in which the output unit outputs the guidance information to a motor that adjusts a position of the camera.

A guidance method according to an eleventh aspect is a guidance method for guiding a camera held by a holder holding the camera that captures a field of view of a microscope through an eyepiece lens of the microscope to an appropriate holding position with respect to an optical axis of the eyepiece lens, the guidance method including: acquiring, from the camera, an image of the field of view captured by the camera held by the holder; specifying a visual field area in the image, the visual field area corresponding to the field of view; obtaining a center of gravity coordinate of the visual field area; creating guidance information to guide the camera to the holding position based on a comparison between the center of gravity coordinate and a reference coordinate corresponding to a center of gravity of the visual field area obtained from an image captured by the camera held at the holding position; and outputting the guidance information.

An imaging device according to a twelfth aspect includes: a camera that captures a field of view of a microscope through an eyepiece lens of the microscope; and the guidance program according to any one of the first to tenth aspects.

An information processing device according to a thirteenth aspect is an information processing device accessible by an imaging device including a camera that captures a field of view of a microscope through an eyepiece lens of the microscope, the information processing device including the guidance program according to any one of the first to tenth aspects.

A microscope device according to a fourteenth aspect includes: a microscope; and a holder that detachably holds an imaging device including a camera that captures a field of view of the microscope through an eyepiece lens of the microscope, and a guidance program according to any one of the first to tenth aspects.

What is claimed is:

1. A guidance method for guiding a camera, which is held by a holder and which captures a field of view of a microscope through an eyepiece lens of the microscope, to an appropriate holding position with respect to an optical axis of the eyepiece lens, the method comprising, by a computer:
    acquiring, from the camera, an image of the field of view captured by the camera held by the holder;
    specifying a visual field area in the image, the visual field area corresponding to the field of view;
    obtaining a center of gravity coordinate of the visual field area;
    creating guidance information to guide the camera to the holding position based on a comparison between the center of gravity coordinate and a reference coordinate corresponding to a center of gravity of the visual field area obtained from an image captured by the camera held at the holding position; and
    outputting the guidance information.

2. The guidance method according to claim 1, wherein the holding position includes a holding position of the camera at which an optical axis of the eyepiece lens and an optical axis of the camera are matched.

3. The guidance method according to claim 1, wherein the computer:
    creates the guidance information in a case in which a distance between the center of gravity coordinate and the reference coordinate is outside a predetermined range, and
    does not create the guidance information in a case in which the distance between the center of gravity coordinate and the reference coordinate is within the predetermined range.

4. The guidance method according to claim 1, wherein:
    each of the center of gravity coordinate and the reference coordinate is represented by a first coordinate and a second coordinate representing a two-dimensional position on an image, and
    the computer creates the guidance information in a case in which at least one of a first value representing an absolute value of a difference between the first coordinate of the center of gravity coordinate and the first coordinate of the reference coordinate, or a second value representing an absolute value of a difference between the second coordinate of the center of gravity coordinate and the second coordinate of the reference coordinate, is outside a predetermined range, and
    the computer does not create the guidance information in a case in which both of the first value and the second value are within the predetermined range.

5. The guidance method according to claim 1, wherein:
    each of the center of gravity coordinate and the reference coordinate is represented by a first coordinate and a second coordinate representing a two-dimensional position on an image, and
    in a case in which both of a first value representing an absolute value of a difference between the first coordinate of the center of gravity coordinate and the first coordinate of the reference coordinate and a second value representing an absolute value of a difference between the second coordinate of the center of gravity coordinate and the second coordinate of the reference coordinate are outside a predetermined range, the computer creates the guidance information for separately adjusting a position of the camera corresponding to the first value and a position of the camera corresponding to the second value.

6. The guidance method according to claim 1, wherein:
    each of the center of gravity coordinate and the reference coordinate is represented by a first coordinate and a second coordinate representing a two-dimensional position on an image, and
    in a case in which both of a first value representing an absolute value of a difference between the first coordinate of the center of gravity coordinate and the first coordinate of the reference coordinate and a second value representing an absolute value of a difference between the second coordinate of the center of gravity coordinate and the second coordinate of the reference coordinate are outside a predetermined range, the computer creates the guidance information for simultaneously adjusting a position of the camera corresponding to the first value and a position of the camera corresponding to the second value.

7. The guidance method according to claim 1, wherein:
each of the center of gravity coordinate and the reference coordinate is represented by a first coordinate and a second coordinate representing a two-dimensional position on an image,
the guidance information is represented as a figure representing a direction in which the camera is guided, and
in a case in which at least one of a first value representing an absolute value of a difference between the first coordinate of the center of gravity coordinate and the first coordinate of the reference coordinate and a second value representing an absolute value of a difference between the second coordinate of the center of gravity coordinate and the second coordinate of the reference coordinate is outside a predetermined range, the computer changes a length of the figure in accordance with the first value or the second value.

8. The guidance method according to claim 1, wherein the computer outputs a direction in which the camera is to be guided to a display unit as the guidance information together with the acquired image.

9. The guidance method according to claim 8, wherein the direction of guidance is represented by at least one of a character or a figure.

10. The guidance method according to claim 1, wherein the computer outputs the guidance information to a motor that adjusts a position of the camera.

11. A non-transitory storage medium storing a guidance program for guiding a camera, which is held by a holder and which captures a field of view of a microscope through an eyepiece lens of the microscope, to an appropriate holding position with respect to an optical axis of the eyepiece lens, the guidance program being executable by a computer to perform processing comprising:
acquiring, from the camera, an image of the field of view captured by the camera held by the holder;
specifying a visual field area in the image, the visual field area corresponding to the field of view;
obtaining a center of gravity coordinate of the visual field area;
creating guidance information to guide the camera to the holding position based on a comparison between the center of gravity coordinate and a reference coordinate corresponding to a center of gravity of the visual field area obtained from an image captured by the camera held at the holding position; and
outputting the guidance information.

12. An imaging device, comprising:
a camera that captures a field of view of a microscope through an eyepiece lens of the microscope; and
the non-transitory storage medium according to claim 11.

13. An information processing device accessible by an imaging device including a camera that captures a field of view of a microscope through an eyepiece lens of the microscope, the information processing device comprising the non-transitory storage medium according to claim 11.

14. A microscope device, comprising:
a microscope; and
a holder that detachably holds an imaging device including:
a camera that captures a field of view of the microscope through an eyepiece lens of the microscope, and
the non-transitory storage medium according to claim 11.

* * * * *